(12) United States Patent
Kondo et al.

(10) Patent No.: US 6,351,494 B1
(45) Date of Patent: *Feb. 26, 2002

(54) CLASSIFIED ADAPTIVE ERROR RECOVERY METHOD AND APPARATUS

(75) Inventors: Tetsujiro Kondo, Kanagawa-Prefecture (JP); James J. Carrig, San Jose, CA (US); Yasuhiro Fujimori, Cupertino, CA (US); William Knox Carey, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/405,866

(22) Filed: Sep. 24, 1999

(51) Int. Cl.[7] .............................. H04B 1/66; H04N 5/21; H04N 5/235; G06K 9/40; G06K 5/00
(52) U.S. Cl. ................................................. 375/240.27
(58) Field of Search .................. 375/240.01, 240.11, 375/240.13, 240.15, 240.16, 240.27, 240.28, 240.29; 348/416.1, 417.1, 458, 616; 382/232, 234, 236, 248, 250, 261; H04B 1/66; H04N 5/21, 5/235; G06K 9/40; G06T 5/00

(56) References Cited

U.S. PATENT DOCUMENTS

| | | |
|---|---|---|
| 3,311,879 A | 3/1967 | Daher |
| 3,805,232 A | 4/1974 | Allen |
| 4,361,853 A | 11/1982 | Remy et al. |
| 4,381,519 A | 4/1983 | Wilkinson et al. |
| 4,419,693 A | 12/1983 | Wilkinson et al. |

(List continued on next page.)

FOREIGN PATENT DOCUMENTS

| | | | |
|---|---|---|---|
| EP | 0 398 741 A | 11/1990 | |
| EP | 0 527 611 | 8/1992 | ............ H04N/9/80 |
| EP | 0 558 016 | 2/1993 | .......... H04N/7/133 |
| EP | 0 566 412 A2 | 4/1993 | |
| EP | 0 571 180 A2 | 5/1993 | |

(List continued on next page.)

OTHER PUBLICATIONS

Ozkan, M.K., et al. Adaptive Motion–Compensated Filtering Of Noisy Image Sequences; IEEE Transactions on pp. 277–290. Aug. 1993 vol. 3, Issue 4.

Sezan, et al. "Temporally Adaptive Filtering Of Noisy Image Sequences Using A Robust Motion Estimation Algorithm"; 1991 International Conference on pp. 2429–2432 vol. 4, Apr. 14–17, 1991.

Crinon, R.J., et al. "Adaptive Model–Based Motion Estimation"; IEEE Transactions on pp. 469–481, vol. 3, Issue 5, Sep. 1994.

Wollborn, M. Prototype Prediction For Colour Update In Object–Based Analysis–Synthesis Coding; IEEE Transactions on pp. 236–245, vol. 4, No. 3, Jun. 1994.

(List continued on next page.)

*Primary Examiner*—Chris Kelley
*Assistant Examiner*—Tung Vo
(74) *Attorney, Agent, or Firm*—Blakely, Sokoloff, Taylor & Zafman LLP

(57) ABSTRACT

A method, apparatus, and article of manufacture for restoring a deteriorated signal to an undeteriorated signal. A deteriorated signal consists of a plurality of deteriorated and undeteriorated data points. For each deteriorated data point, a plurality of class types including a motion vector class is created based upon characteristics of the area containing the deteriorated data point. The data point is classified with respect to one of the plurality of class types and assigned a corresponding input signal class. The undeteriorated signal is generated by adaptively filtering the deteriorated input signal in accordance with the input signal classification result. More than one classification method is used to create the plurality of class types. Created classes may include a motion class, an error class, a spatial class, a spatial activity class, or a motion vector class.

24 Claims, 26 Drawing Sheets

U.S. PATENT DOCUMENTS

| | | |
|---|---|---|
| 4,532,628 A | 7/1985 | Matthews |
| 4,574,393 A | 3/1986 | Blackwell et al. |
| 4,586,082 A | 4/1986 | Wilkinson .................. 348/616 |
| 4,656,514 A | 4/1987 | Wilkinson et al. .......... 348/616 |
| 4,675,735 A | 6/1987 | Wilkinson et al. .......... 348/616 |
| 4,703,351 A | 10/1987 | Kondo |
| 4,703,352 A | 10/1987 | Kondo |
| 4,710,811 A | 12/1987 | Kondo |
| 4,722,003 A | 1/1988 | Kondo |
| 4,729,021 A | 3/1988 | Kondo |
| 4,772,947 A | 9/1988 | Kondo |
| 4,788,589 A | 11/1988 | Kondo |
| 4,807,033 A | 2/1989 | Keesen et al. ............... 348/616 |
| 4,815,078 A | 3/1989 | Shimura |
| 4,845,560 A | 7/1989 | Kondo et al. |
| 4,890,161 A | 12/1989 | Kondo |
| 4,924,310 A | 5/1990 | Von Brandt |
| 4,953,023 A | 8/1990 | Kondo |
| 4,975,915 A | 12/1990 | Sako et al. |
| 4,979,040 A | 12/1990 | Masumoto |
| 5,023,710 A | 6/1991 | Kondo et al. |
| 5,043,810 A | 8/1991 | Vreeswijk et al. |
| 5,086,489 A | 2/1992 | Shimura |
| 5,093,872 A | 3/1992 | Tutt |
| 5,101,446 A | 3/1992 | Resnikoff et al. |
| 5,122,873 A | 6/1992 | Golin |
| 5,134,479 A | 7/1992 | Ohishi |
| 5,142,537 A | 8/1992 | Kutner et al. |
| 5,150,210 A | 9/1992 | Hoshi et al. |
| 5,159,452 A | 10/1992 | Kinoshita |
| 5,166,987 A | 11/1992 | Kageyama |
| 5,177,797 A | 1/1993 | Takenaka et al. |
| 5,185,746 A | 2/1993 | Tanaka et al. |
| 5,196,931 A | 3/1993 | Kondo |
| 5,208,816 A | 5/1993 | Seshardi et al. |
| 5,237,424 A | 8/1993 | Nishino et al. |
| 5,241,381 A | 8/1993 | Kondo |
| 5,243,428 A | 9/1993 | Challapali et al. |
| 5,247,363 A | 9/1993 | Sun et al. |
| 5,258,835 A | 11/1993 | Kato |
| 5,307,175 A | 4/1994 | Seachman |
| 5,327,502 A | 7/1994 | Katata et al. |
| 5,337,087 A | 8/1994 | Mishima |
| 5,359,694 A | 10/1994 | Concordel |
| 5,379,072 A | 1/1995 | Kondo |
| 5,398,078 A | 3/1995 | Masuda et al. |
| 5,400,076 A | 3/1995 | Iwamura ................ 375/240.15 |
| 5,406,334 A | 4/1995 | Kondo et al. |
| 5,416,651 A | 5/1995 | Uetake et al. |
| 5,416,847 A | 5/1995 | Boze |
| 5,428,403 A | 6/1995 | Andrew et al. |
| 5,434,716 A | 7/1995 | Sugiyama et al. |
| 5,438,369 A | 8/1995 | Citta et al. |
| 5,446,456 A | 8/1995 | Seo |
| 5,455,629 A | 10/1995 | Sun et al. |
| 5,469,216 A | 11/1995 | Takahashi et al. |
| 5,469,474 A | 11/1995 | Kitabatake |
| 5,471,501 A | 11/1995 | Parr et al. |
| 5,473,479 A | 12/1995 | Takahura |
| 5,481,554 A | 1/1996 | Kondo |
| 5,481,627 A | 1/1996 | Kim |
| 5,495,298 A | 2/1996 | Uchida et al. |
| 5,499,057 A | 3/1996 | Kondo et al. |
| 5,528,608 A | 6/1996 | Shimizume |
| 5,546,130 A | 8/1996 | Hackett et al. ............. 348/447 |
| 5,557,420 A | 9/1996 | Yanagihara et al. |
| 5,557,479 A | 9/1996 | Yanagihara |
| 5,568,196 A | 10/1996 | Hamada et al. |
| 5,577,053 A | 11/1996 | Dent |
| 5,579,051 A | 11/1996 | Murakami et al. |
| 5,594,807 A | 1/1997 | Liu |
| 5,598,214 A | 1/1997 | Kondo et al. |
| 5,617,135 A | 4/1997 | Noda et al. .................... 348/12 |
| 5,617,333 A | 4/1997 | Oyamada et al. |
| 5,625,715 A | 4/1997 | Trew et al. |
| 5,636,316 A | 6/1997 | Oku et al. |
| 5,649,053 A | 7/1997 | Kim |
| 5,663,764 A | 9/1997 | Kondo et al. |
| 5,673,357 A | 9/1997 | Shima |
| 5,677,734 A | 10/1997 | Oikawa et al. |
| 5,689,302 A | 11/1997 | Jones |
| 5,699,475 A | 12/1997 | Oguro et al. |
| 5,703,889 A | 12/1997 | Shimoda et al. |
| 5,724,099 A | 3/1998 | Hamdi et al. |
| 5,724,369 A | 3/1998 | Brailean et al. |
| 5,737,022 A | 4/1998 | Yamaguchi et al. |
| 5,751,361 A | 5/1998 | Kim |
| 5,751,743 A | 5/1998 | Takazawa |
| 5,751,862 A | 5/1998 | Williams et al. |
| 5,786,857 A | 7/1998 | Yamaguchi |
| 5,790,195 A | 8/1998 | Ohsawa |
| 5,796,786 A | 8/1998 | Lee |
| 5,805,762 A | 9/1998 | Boyce et al. |
| 5,809,041 A | 9/1998 | Shikakura et al. .......... 714/747 |
| 5,809,231 A | 9/1998 | Yokoyama et al. |
| 5,852,470 A | 12/1998 | Kondo et al. |
| 5,861,922 A | 1/1999 | Murashita et al. |
| 5,878,183 A | 3/1999 | Sugiyama et al. |
| 5,883,983 A | 3/1999 | Lee et al. .................... 382/268 |
| 5,903,481 A | 5/1999 | Kondo et al. |
| 5,938,318 A | 7/1999 | Araki |
| 5,936,674 A | 8/1999 | Kim |
| 5,940,539 A | 8/1999 | Kondo et al. |
| 5,946,044 A | 8/1999 | Kondo et al. ................ 348/458 |
| 6,018,317 A | 1/2000 | Dogan et al. ................ 342/378 |
| 6,067,636 A | 5/2000 | Yao et al. |
| 6,104,434 A | 8/2000 | Nakagawa et al. .......... 348/403 |
| 6,137,915 A | 10/2000 | Chai ............................. 399/7 |
| 6,151,416 A | 11/2000 | Kondo et al. ................ 382/261 |
| 6,164,540 A | 12/2000 | Bridgelall et al. ..... 235/462.01 |
| 6,192,079 B1 | 2/2001 | Sharma et al. ......... 375/240.16 |
| 6,192,161 B1 | 2/2001 | Kondo et al. ................ 382/261 |

FOREIGN PATENT DOCUMENTS

| | | | |
|---|---|---|---|
| EP | 0 592 196 A2 | 10/1993 | |
| EP | 0 596 826 | 11/1993 | ............ H04N/5/92 |
| EP | 0 605 209 A2 | 12/1993 | |
| EP | 0 610 587 | 12/1993 | |
| EP | 0 592 196 A2 | 4/1994 | |
| EP | 0 597 576 A | 5/1994 | |
| EP | 0 651 584 A2 | 10/1994 | |
| EP | 0 680 209 | 4/1995 | ............ H04N/5/91 |
| EP | 0 746 157 A2 | 5/1996 | |
| EP | 0 833 517 | 4/1998 | ............ H04N/7/30 |
| GB | 2 280 812 A | 2/1995 | |
| GB | 2 320 836 A | 11/1997 | |
| JP | 7-67028 | 3/1995 | .......... H04N/5/235 |
| WO | WO96/07987 | 9/1995 | |
| WO | WO 97/46019 | 12/1997 | |
| WO | WO99/21285 | 10/1998 | |
| WO | 99 21090 A | 4/1999 | |
| WO | WO 00/48126 | 8/2000 | |

OTHER PUBLICATIONS

Patti, A.J., et al., Robust Methods For High–Quality Stills From Interlaced Video In the Presence Of Dominant Motion; IEEE Transactions on pp. 328–342, vol. 7, No. 2, Apr. 1997.

Meguro, et al., "Adaptive Order Statistics Filter Based On Fuzzy Rules For Image Processing", pp. 70–80, ©1997 Scripta Technica, Inc.

PCT Written Opinion PCT/US00/03738, 7 pgs., Jan. 26, 2001.
International Search Report PCT/US00/23035, 5 pgs., Jan. 22, 2001.
Jeng, et al., "Concealment Of Bit Error And Cell Loss In Inter–Frame Coded Video Transmission", 1991 IEEE, 17.4.1–17.4.5.
Monet, et al., "Block Adaptive Quantization Of Images", IEEE 1993, pp. 303–306.
International Search Report PCT/US00/03738, Feb. 11, 2000, 9 pgs.
Stammnitz, et al., "Digital HDTV Experimental System", pp. 535–542.
International Search Report PCT/US00/03508, Feb. 9, 2000, 8 pgs.
Chu, et al., Detection and Concealment of Transmission Errors in H.261 Images, XP–000737027, pp. 74–84, IEEE transactions, Feb. 1998.
Zhu, et al., "Coding and Cell–Loss Recovery in DCT–Based Packet Video", IEEE Transactions on Circuits and Systems for Video Technology, Jun. 3, 1993, No. 3, NY.
International Search Report PCT/US98/22347, Mar. 16, 1999, 2 pgs.
International Search Report PCT/US95/22531, Apr. 1, 1999, 1 pg.
International Search Report PCT/US98/22411, Feb. 25, 1999, 1 pg.
International Search Report PCT/US98/22412, Oct. 5, 1999, 5 pgs.
International Search Report PCT/US00/03595, 6 pgs., Feb. 10, 2000.
International Search Report PCT/US00/03439, Feb. 9, 2000, 8 pgs.
International Search Report PCT/US00/03595, Feb. 10, 2000, 6 pgs.
International Search Report PCT/US00/03611, Feb. 10, 2000, 8 pgs.
International Search Report PCT/US00/03599, Feb. 10, 2000, 4 pgs.
International Search Report PCT/US00/03742, Feb. 11, 2000, 5 pgs.
International Search Report PCT/US00/03654, Feb. 10, 2000, 4 pgs.
International Search Report PCT/US00/03299, Feb. 9, 2000, 5 pgs.
Park, et al., "A Simple Concealment For ATM Bursty Cell Loss", IEEE transactions of Consumer Electronics, No. 3, Aug. 1993, pp. 704–709.
Tom, et al., "Packet Video for Cell Loss Protection Using Deinterleaving and Scrambling", ICASSP 91: 1991 International conference on Acoustics, Speech and Signal Processing, vol. 4, pp. 257–2860, Apr. 1991.
NKH Laboratories Note, "Error Correction, Concealment and Shuffling", No. 424, Mar. 1994, pp. 29–44.
Kondo,et al., "Adaptive Dynamic Range Coding Scheme For Future HDTV Digital VTR", Fourth International Workshop on HDTV and Beyond, Sep. 4–6, Turin, Italy.
Kondo,et al., "A New Concealment Method For Digital VCR's", IEEE Visual Signal Processing and Communication, pp. 20–22, 9/93, Melbourne, australia.
Kim, et al., "Bit Rate Reduction Algorithm For A Digital VCR", IEEE Transactions on Consumer Electronics, vol. 37, No. 3, Aug. 1, 1992, pp. 267–274.

R.C. Gonzalez, et al., "Digital Image Processing", Addison Wesley Publishing Company, Inc., 1992, pp. 67–88.
R. Aravind, et al., "Image and Video Coding Standards", AT&T Technical Journal Jan./Feb. 1993, pp. 67–88.
Translation of Abstract of Japanese Patent No. 61147690.
Translation of Abstract of Japanese Patent No. 63256080.
Translation of Abstract of Japanese Patent No. 63257390.
Translation of Abstract of Japanese Patent No. 02194785.
Translation of Abstract of Japanese Patent No. 03024885.
Translation of Abstract of Japanese Patent No. 04037293.
Translation of Abstract of Japanese Patent No. 04316293.
Translation of Abstract of Japanese Patent No. 04329088.
Translation of Abstract of Japanese Patent No. 05047116.
Translation of Abstract of Japanese Patent No. 05244579.
Translation of Abstract of Japanese Patent No. 05244580.
Translation of Abstract of Japanese Patent No. 05244559.
Translation of Abstract of Japanese Patent No. 05304659.
Translation of Abstract of Japanese Patent No. 06086259.
Translation of Abstract of Japanese Patent No. 06113258.
Translation of Abstract of Japanese Patent No. 06125534.
Translation of Abstract of Japanese Patent No. 06162693.
Translation of Abstract of Japanese Patent No. 06253287.
Translation of Abstract of Japanese Patent No. 06253280.
Translation of Abstract of Japanese Patent No. 06253284.
Translation of Abstract of Japanese Patent No. 07046604.
Translation of Abstract of Japanese Patent No. 07085611.
Translation of Abstract of Japanese Patent No. 07095581.
Translation of Abstract of Japanese Patent No. 07177505.
Translation of Abstract of Japanese Patent No. 07177506.
Translation of Abstract of Japanese Patent No. 07240903.
Japanese Patent No. 05304659 and translation of Abstract.
Japanese Patent No. 05244578 and translation of Abstract.
Japanese Patent No. 05300485 and translation of Abstract.
Japanese Patent No. 06070298 and translation of Abstract.
Japanese Patent No. 06006778 and translation of Abstract.
Japanese Patent No. 06113256 and translation of Abstract.
Japanese Patent No. 06113275 and translation of Abstract.
Japanese Patent No. 06253287 and translation of Abstract.
Japanese Patent No. 06253280 and translation of Abstract.
Japanese Patent No. 06253284 and translation of Abstract.
Japanese Patent No. 06350981 and translation of Abstract.
Japanese Patent No. 06350982 and translation of Abstract.
Japanese Patent No. 08317394 and translation of Abstract.
Japanese Patent No. 07023388 and translation of Abstract.
Japanese Patent No. 04245881 and translation of Abstract.
Japanese Patent No. 04115628 and translation of Abstract.
Japanese Patent No. 04115686 and translation of Abstract.

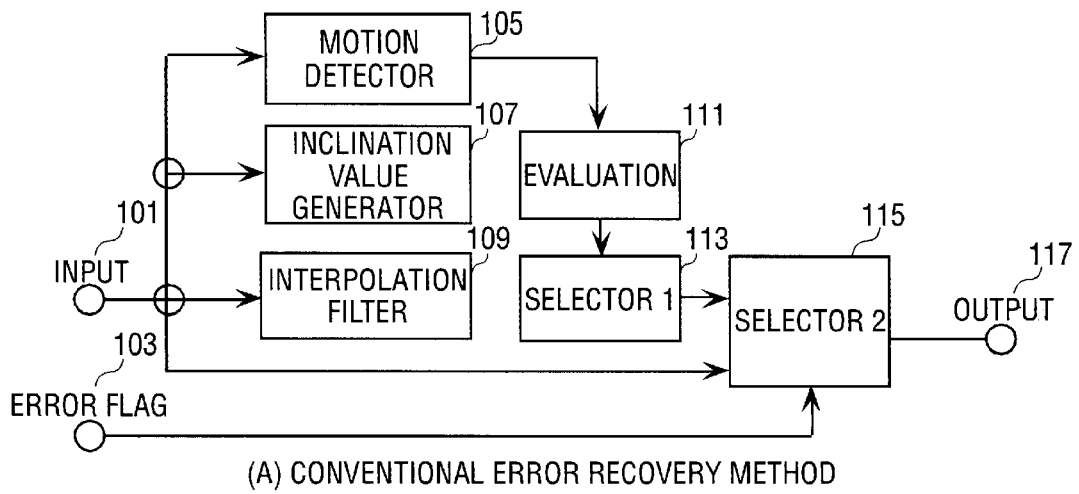
(A) CONVENTIONAL ERROR RECOVERY METHOD
FIG. 1(A)
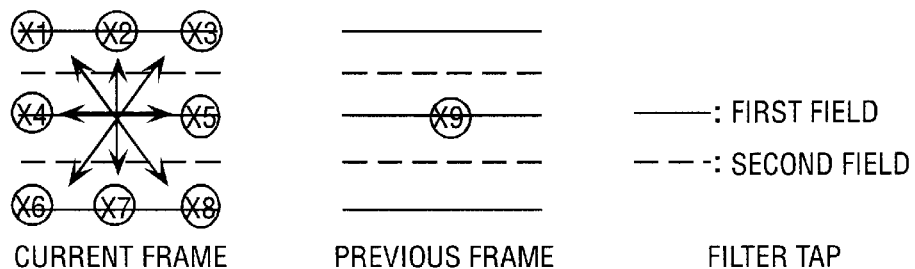
FIG. 1(B)
INCLINATION VALUE EI:          INTERPOLATION FILTER YI:
MOTION AREA:  $E1 = |X1-X8|$  →  $Y1 + (X1+X8)/2$
$E2 = |X2-X7|$  →  $Y2 + (X2+X7)/2$
$E3 = |X3-X6|$  →  $Y3 + (X3+X6)/2$
$E4 = |X4-X5|$  →  $Y4 + (X4+X5)/2$
STATIONARY AREA  →  $Y5 = X9$
(C) CORRESPONDENCE BETWEEN INCLINATION VALUE AND INTERPOLATION FILTER
FIG. 1(C)

ERROR CLASS 0
(INDEPENDENT ERROR)

ERROR CLASS 1
(LEFT ERRONEOUS CASE)

ERROR CLASS 2
(RIGHT ERRONEOUS CASE)

ERROR CLASS 3
(CONSECUTIVE ERRONEOUS CASE)

ERROR CLASS TAP

——————— : FIRST FIELD

— — — — — : SECOND FIELD

MOTION CLASS 0 & 1   MOTION CLASS 2 & 3

ERROR CLASS 1 (LEFT ERRONEOUS CASE)
ADAPTIVE SPATIAL CLASS TAP (ERROR CLASS1)

MOTION CLASS 0 & 1   MOTION CLASS 2 & 3

————— : FIRST FIELD

– – – – – : SECOND FIELD

ERROR CLASS 2 (RIGHT ERRONEOUS CASE)

ADAPTIVE SPATIAL CLASS TAP (ERROR CLASS2)

INDEPENDENT ERRONEOUS CASE    LEFT ERRONEOUS CASE

RIGHT ERRONEOUS CASE    CONSECUTIVE ERRONEOUS CASE

ADAPTIVE FILTERTAP

ADAPTIVE FILTER TAP (ERROR CLASS0)

ADAPTIVE FILTER TAP (ERROR CLASS1)

ADAPTIVE FILTER TAP (ERROR CLASS2)

(MOTION CLASS = 0, 1)

ADAPTIVE FILTER TAP (ERROR CLASS3)

| MEMORY ADDRESS | | | MEMORY DATA |
|---|---|---|---|
| ERROR CLASS | MOTION CLASS | ADRC CLASS | FILTER COEFFICIENT |
| 0 | 0 | 0 | W0,0   W0,1 ----- W0,12   W0,13 |
|   |   | ⋮ | ⋮ |
|   |   | 7 | W7,0   W7,1 ----- W7,12   W7,13 |
|   | ⋮ | ⋮ | ⋮ |
|   | 3 | 0 | W24,0   W24,1 ----- W24,12   W24,13 |
|   |   | ⋮ | ⋮ |
|   |   | 7 | W31,0   W31,1 ----- W31,12   W31,13 |
| ⋮ | ⋮ | ⋮ | ⋮ |
| 3 | 0 | 0 | W96,0   W96,1 ----- W96,12   W96,13 |
|   |   | ⋮ | ⋮ |
|   |   | 7 | W103,0   W103,1 ----- W103,12   W103,13 |
|   | ⋮ | ⋮ | ⋮ |
|   | 3 | 0 | W120,0   W120,1 ----- W120,12   W120,13 |
|   |   | ⋮ | ⋮ |
|   |   | 7 | W127,0   W127,1 ----- W127,12   W127,13 |

COEFFICIENTS MEMORY CONTENTS

ADRC CLASS REDUCTION

CLASSIFIED ADAPTIVE ERROR RECOVERY METHOD AND APPARATUS

FIELD OF THE INVENTION

This invention relates generally to the processing of image, sound or other correlated signals, and more particularly, to a method, apparatus, and article of manufacture for restoring a deteriorated signal to an undeteriorated signal.

BACKGROUND OF THE INVENTION

Conventionally, to restore an image that is deteriorated in image quality it is necessary to analyze the cause of the deterioration, determine a deterioration model function, and apply its inverse function to the deteriorated image. Various causes of deteriorations are possible, such as a uniform movement of a camera (imaging device such as a video camera) and blurring caused by the optical system of a camera. Therefore, in restoring an image, different model functions may be used for respective causes of deteriorations. Unless the cause of deterioration is found, it is difficult to restore a deteriorated image because a model function cannot be determined.

In addition, it is frequently the case that even if a model function of a deterioration is established, there is no inverse function for restoration that corresponds to the model function. In such a case, it is difficult to perform evaluation for determining the optimum model.

Conventionally, error recovery has been achieved by correlation evaluation. For example, some recovery choices have been implemented using a conventional error pixel recovery method. FIG. 1A shows a conventional error recovery block diagram. Using neighboring data, which are shown in FIG. 1B, spatial inclinations of the target data are detected. In this example, the inclinations regarding four directions are evaluated according to the formulae which are shown in FIG. 1C. An interpolation filter is chosen where the inclination value, $E_i$, is the smallest among four values. In addition to the spatial inclination, a motion factor is also evaluated for error recovery. In the case of the motion area, a selected spatial filter is used for error recovery. On the other hand, the previous frame data at the same location as the target data are used for error recovery. This evaluation is performed in the evaluation block of FIG. 1A.

The conventional error recovery process shown in FIGS. 1A–1C may cause many serious degradations on changing data, especially on object edges. Actual signal distribution typically varies widely, so these problems are likely to occur. Therefore, there is a need for a way to restore a deteriorated signal to an undeteriorated signal which minimizes degradations on changing data.

SUMMARY OF THE INVENTION

The present invention provides a method, apparatus, and article of manufacture for restoring a deteriorated signal to an undeteriorated signal. A deteriorated signal consists of a plurality of deteriorated and undeteriorated data points. For each deteriorated data point, a plurality of class types is created based upon characteristics of the area containing the deteriorated data point. The data point is classified with respect to one of the plurality of class types and assigned a corresponding input signal class. The undeteriorated signal is generated by adaptive filtering of the input signal in accordance with the input signal classification results. More than one classification method may optionally be used to create the plurality of class types. Created classes may include a motion vector class, a motion class, an error class, a spatial class or a spatial activity class. An adaptive class tap structure may optionally be used to create the plurality of class types. An adaptive filter tap structure may optionally be used base on the corresponding plurality of class types. Filter tap expansion may optionally be used to reduce the number of filter coefficients. A spatial class may optionally be modified according to spatial symmetry.

BRIEF DESCRIPTION OF THE DRAWINGS

The present invention is illustrated by way of example and may be better understood by referring to the following description in conjunction with the accompanying drawings, in which like references indicate similar elements and in which:

FIGS. 1A–1C show a conventional error recovery method, filter tap, and correspondence between inclination value and interpolation filter;

DETAILED DESCRIPTION

Figure 2A:
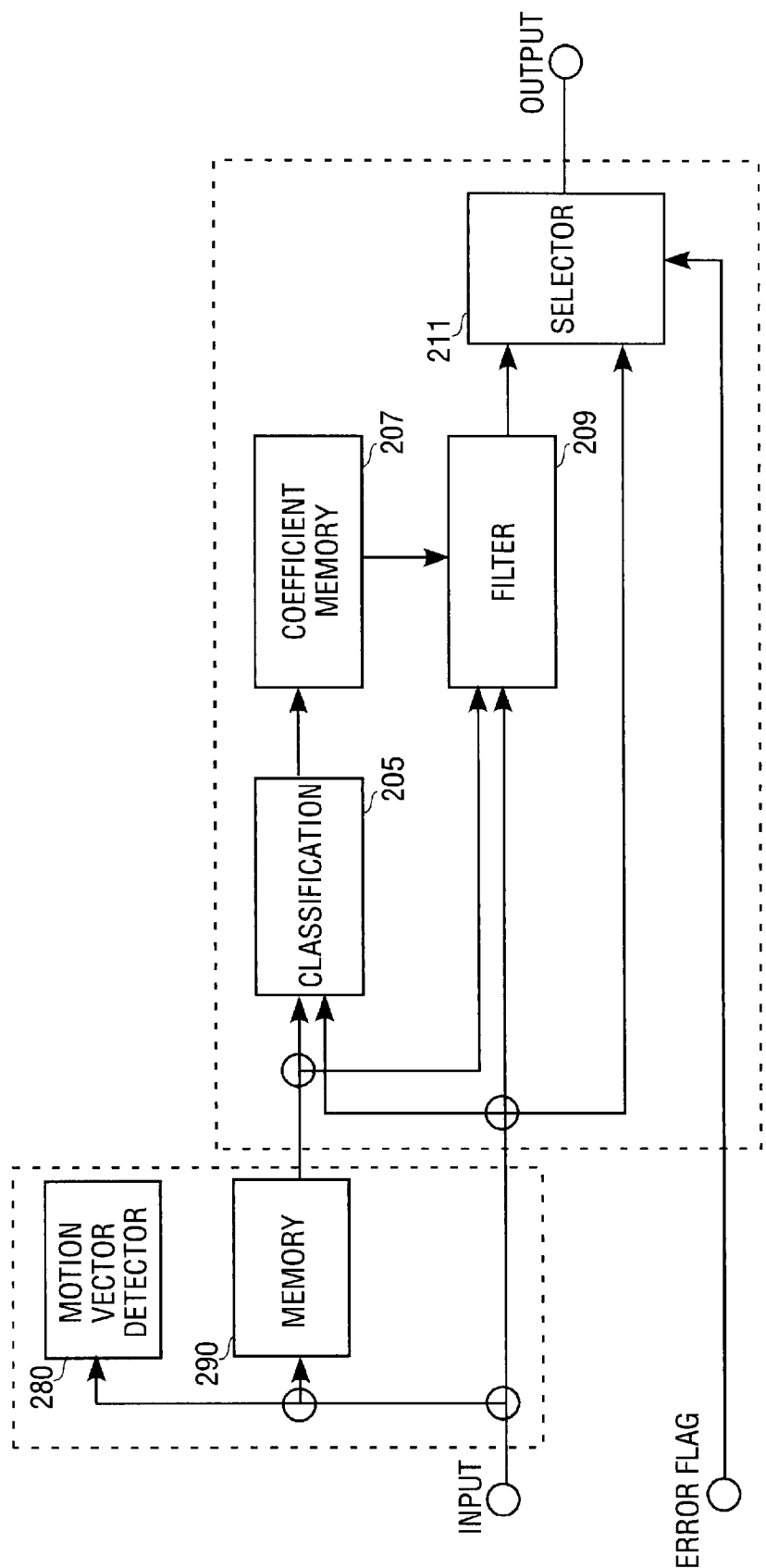
FIGS. 2A–2E show a classified adaptive error recovery method and class compatible with an embodiment of the present invention.

In the following description, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The present invention provides a method, apparatus, and article of manufacture for restoring a deteriorated signal to an undeteriorated signal using classified adaptive error recovery. Target data is the particular data of the deteriorated signal whose value is to be determined or estimated.

Classified adaptive error recovery is the technology which utilizes classified adaptive filter processing. A proper classification with respect to the deteriorated input signal is performed according to the input signal characteristics. An adaptive filter is prepared for each class prior to error recovery processing.

More than one classification method may optionally be used to generate the plurality of classes. Generated classes may include a motion class, an error class, a spatial activity class or a spatial class. An adaptive class tap structure may optionally be used to generate the plurality of classes. An adaptive filter tap structure may optionally be used according to the class which is detected in each deteriorated input signal. The adaptive filter tap structure may optionally be expanded based upon multiple taps. The number of filter coefficients that must be stored can be reduced by allocating the same coefficient to multiple taps. This process is referred to as filter tap expansion. The deteriorated input signal may optionally be modified by preprocessing peripheral erroneous data. A spatial class may optionally be eliminated according to a spatial class elimination formula.

The present invention can be applied to any form of correlated data, including without limitation photographs or other two-dimensional static images, holograms, or other three-dimensional static images, video or other two-dimensional moving images, three-dimensional moving images, a monaural sound stream, or sound separated into a number of spatially related streams, such as stereo. In the description, the term value, in one embodiment, may refer to a component within a set of received or generated data. Furthermore, a data point is a position, place, instance, location or range within data.

For the sake of clarity, some of the description herein focuses on video data comprising a pixel stream. However, it will be recognized that the present invention may be used with other types of data other than video data and that the terms and phrases used herein to describe the present invention cover a broad range of applications and data types. For example, an adaptive class tap structure is an adaptive structure for class tap definition used in multiple classification. A spatial class, a motion class and an error class may be used to define the structure. An adaptive filter tap structure is an adaptive structure for filter tap definition based upon a corresponding class.

A class may be defined based on one or more characteristics of the target data. For example, a class may also be defined based on one or more characteristics of the group containing the target data. A class ID is a specific value within the class that is used to describe and differentiate the target data from other data with respect to a particular characteristic. A class ID may be represented by a number, a symbol, or a code within a defined range. A parameter may be used as a predetermined or variable quantity that is used in evaluating, estimating, or classifying the data. For example, the particular motion class ID of a target data can be determined by comparing the level of motion quantity in the block containing the target data against a parameter which can be a pre-determined threshold.

The original data may be estimated with neighboring data using the classified adaptive error recovery method, which classifies and filters the data. Generally speaking, data that is spatially close to error data may have a greater contribution to estimating the correct value because of the high spatial correlation. If temporal tap data is introduced for classification and filtering in motion areas, the estimation performance may be decreased because of lower spatial correlation caused by the motion.

In one embodiment, a preprocessing step can introduce motion compensation before classifying the adaptive error recovery. Thus, to improve the error recovery performance of classified adaptive error recovery method, motion compensation preprocessing for erroneous data may be performed before the classified adaptive error recovery method.

In one embodiment, the motion compensation preprocessing has two components. One is motion vector detection. The other is shifting the motion affected data (hereinafter referred to as the "memorized data") according to the motion vector. The fundamental structure for performing the pre-processing method is shown in FIG. 2A. The motion compensation structure comprises two processing elements, a motion vector detector 280, and a memory 290. The motion vector is detected by the motion vector detector 280 by examining the temporal correlation. A number of conventional methods may be used. According to this detected motion vector, the neighboring image data used, e.g., an image of a prior field or frame stored in memory, 290 is shifted. The neighboring data may be data that is temporally prior or subsequent, as well as data that is spatially adjacent or non-adjacent data, e.g. frames of data. In one embodiment, the shift operation is accomplished by shifting the memory addresses accessed to form the motion compensated data. The motion compensated data is provided for the following classified adaptive error recovery.

The motion compensation preprocessing can greatly improve the estimation performance of the classified adaptive error recovery process, because the motion area data can provide a higher correlation. As a result, improved error recovered images can be achieved by this method.

Figure 2B:
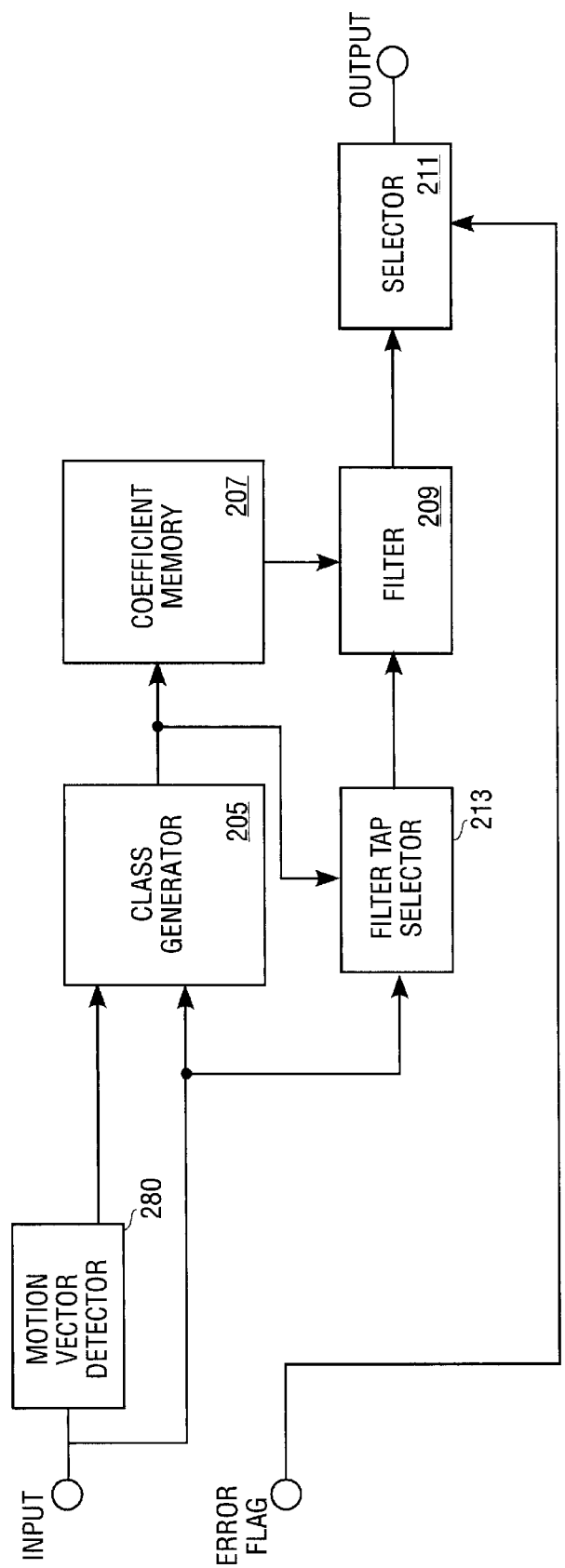
Figure 2:
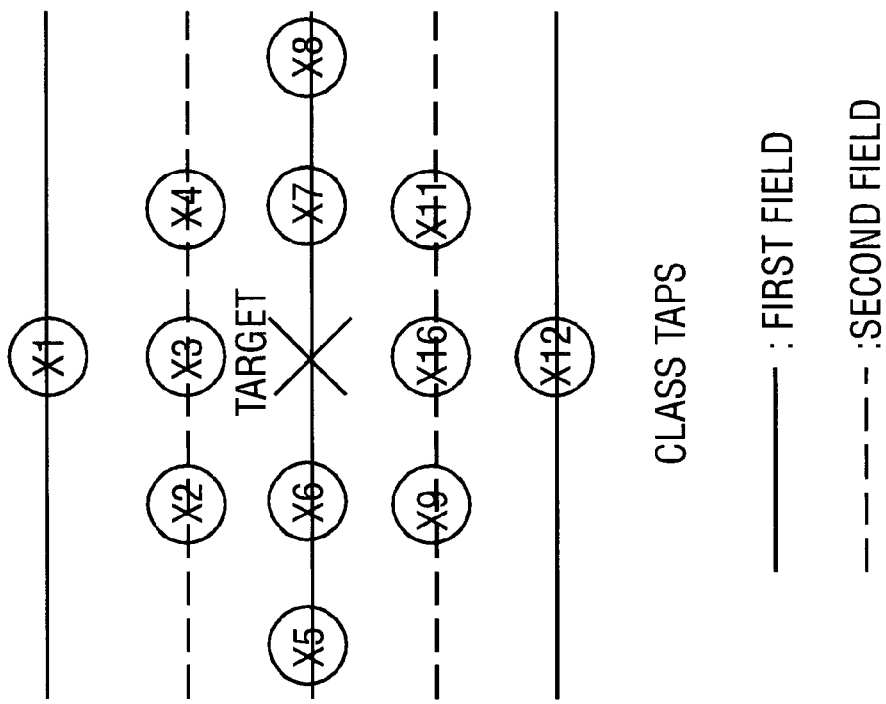
FIGS. 2F–2I show motion compensation preprocessing compatible with an embodiment of the present invention.
FIG. 2J shows a motion vector field compatible with an embodiment of the present invention.
Figure 2:
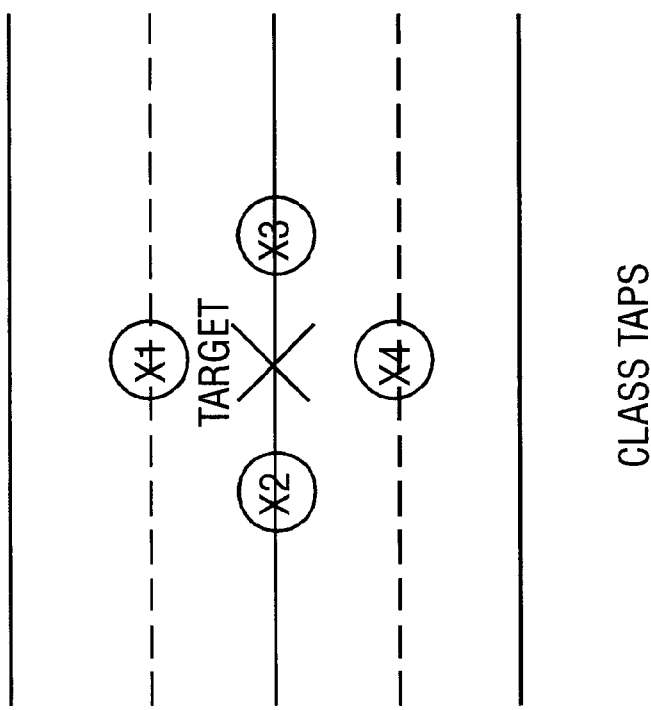

In an alternative embodiment, as shown in FIG. 2B, as motion vector class type is created. Input data and corresponding error flags are input to the system. A motion vector is detected from the input data at 280. Motion vector classification is performed at 205. Filter tap data are chosen at 213 based on the motion vector class. Error recovery filtering is performed at 209 with tap data and filter coefficients selected from the coefficient memory 207. Error recovered data and error free input data are selected at 211 recording to the error flag, which produces the output of the system.

The motion vector detector 280 shown in FIG. 2A determines a motion vector in an image. Examples of motion vectors are shown in FIGS. 2F and 2G. In FIG. 2F, the point (i, j) at time t=0 is shown in a first position ($i_0$, $j_0$). At a second time, t=a, the point is in a second position ($i_a$, $j_a$). The motion vector in FIG. 2F is the line segment that begins at point ($i_0$, $j_0$) and ends at point ($i_a$, $j_a$). Thus, if there is motion in an image, the moving part of the image is duplicated in its new location. In one embodiment, the memorized data stored in memory 290 is data for the previous time, t=0. In an alternative embodiment, the memorized data stored in memory 290 is data for a future time. The motion vector is used by shifting logic to shift a position of the memorized image data to a second position, for the current time t=a.

Referring to FIG. 2G, the image data 250 for previous time t=$T_{-1}$ is in a first position. In the current frame, image data 250 for the current time t=$T_0$ has moved to a second position. The memory stores the prior frame data with image 250 in the first position. After the motion vector MV is detected, the position of image 250 within memory is shifted to the second position.

The motion vector may be detected by a variety of techniques. Three examples of methods for detecting a motion vector include phase correlation, gradient descent, and block matching.

An example of the phase correlation technique is as follows. $F(\omega_1, \omega_2)$ is defined as the Fourier Transform of an image point $f(x_1, x_2)$. Applying the shifting property of Fourier Transforms, the Fourier Transform of $f(x_1+\alpha_1, x_2+\alpha_2)$ can be $e^{j2\pi(\alpha 1\omega 1+\alpha 2\omega 2)} * F(\omega_1, \omega_2)$. Thus, the motion vector quantity represented by $\alpha_1$ and $\alpha_2$ can be estimated by calculating the Fourier Transform of both $f(x_1, x_2)$ and $f(x_1+\alpha_1, x_2+\alpha_2)$, and then estimating the multiplicative factor that relates the two.

An example of the gradient descent technique is as follows. The error function for an image $e(\alpha)$ may be computed as $f(x+v-\alpha)-f(x)$, where v represents the real motion vector and $\alpha$ represents an estimate of v. The gradient descent technique is used to minimize $e(\alpha)$. Thus the minimum of $e(\alpha)$ is representative of the motion vector.

One embodiment of the block matching technique detects a motion vector using pattern matching. For example, at each search point (e.g. point of the image), the temporal correlation is measured. For example, a correlation value corresponding to the summed absolute temporal differences between the current block data and the corresponding past block data at each point is generated. After generating the values at all or some points, the motion vector with the smallest value is chosen. This is representative of the highest correlated point presenting a motion vector.

Figure 2E:
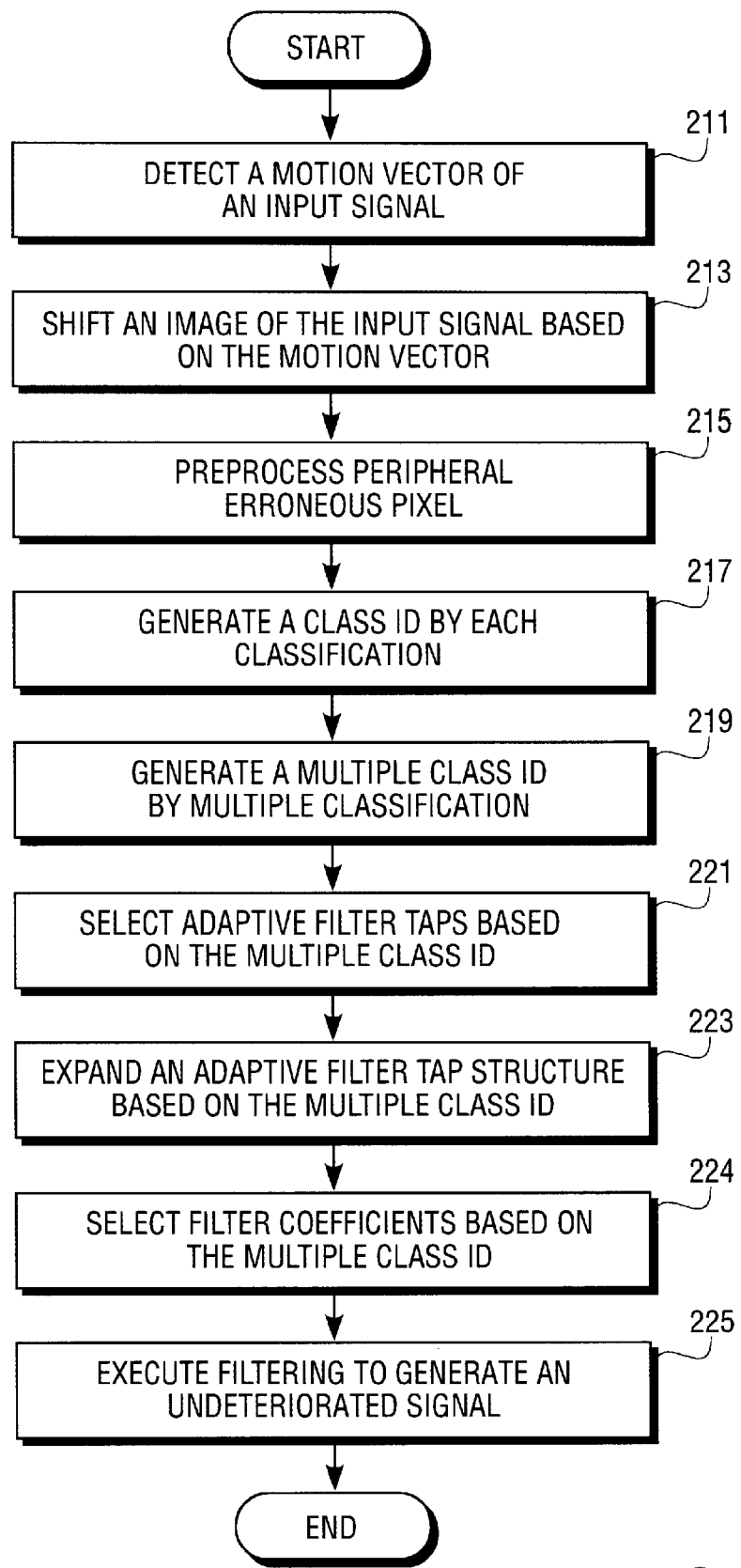
Figure 2G:
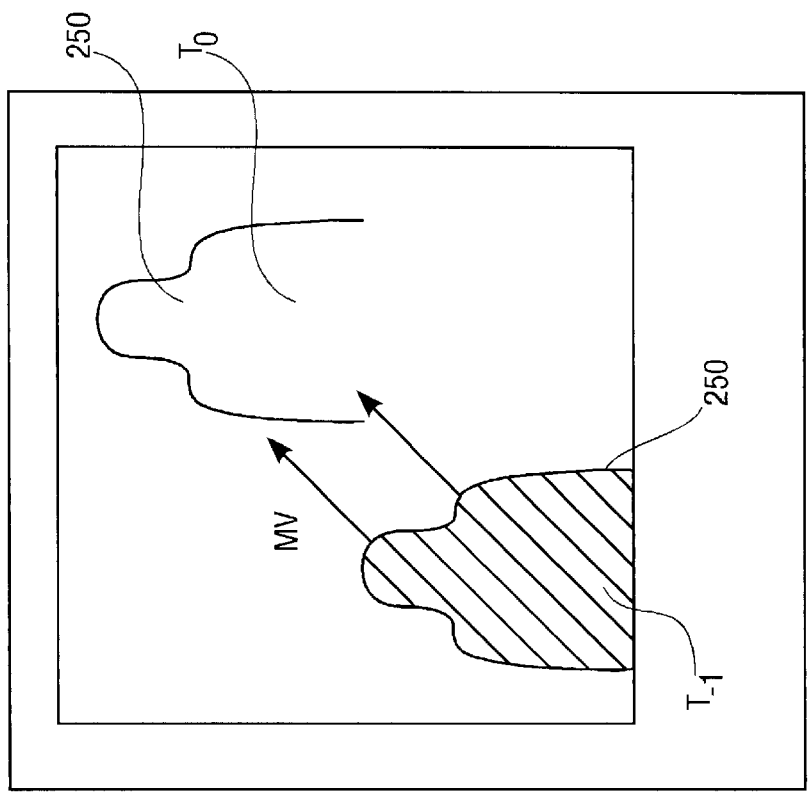
Figure 2F:
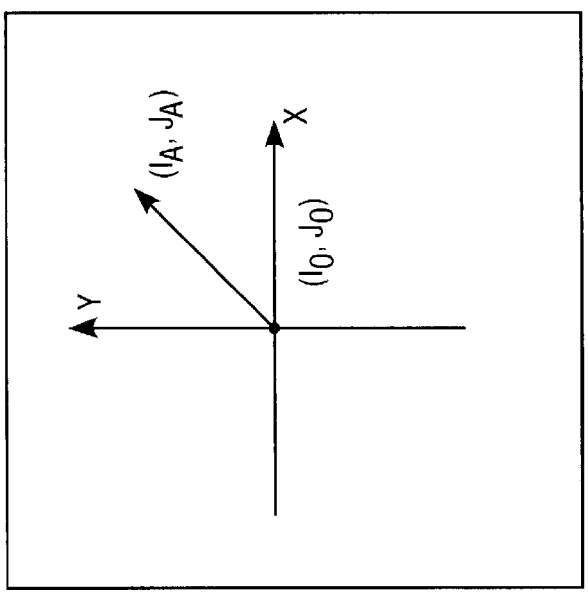
Figure 2H:
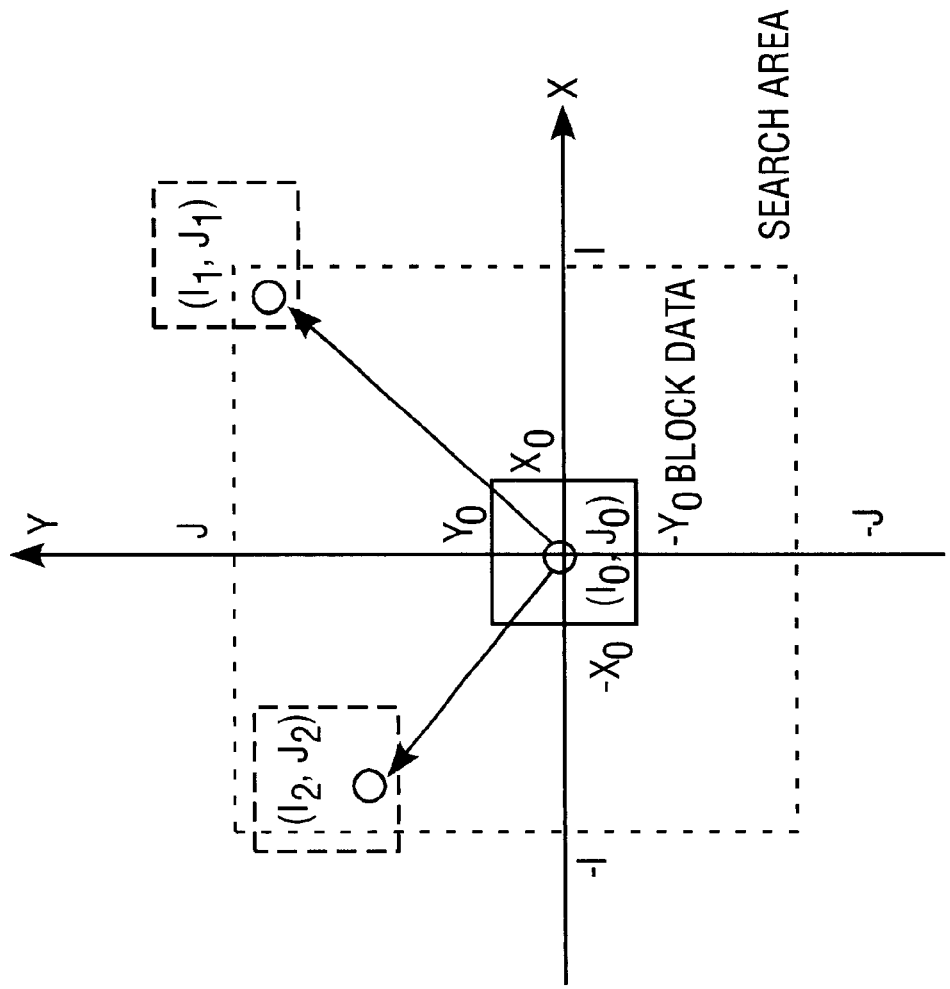

The block matching process is illustrated in FIG. 2H. An original block area is defined as shown in FIG. 2H. The block data is defined as $f(i_0+X, j_0+Y)$. A searching point f(i, j) is detected. The equation $$E(i, j) = \sum_x \sum_y |f(i_0 + X, j_0 + Y) - f(i + X, j + Y)|$$

is representative of the summed temporal differences. The motion vector MV may then be determined as min {E(i, j)};-I≦i≦I;-J≦j≦J.

By utilizing motion compensation preprocessing to perform motion compensation between frames, intra frame data generation can be used for classified adaptive error recovery processing. This is generally illustrated by FIG. 2I. After introducing motion compensation, spatial temporal data can be treated as spatial stationary data. FIG. 2I shows two fields in a frame during multiple time periods. Field 260 during time period $T_3$ contains error data. This error data is highly correlated with pixel 262 in field 264 from time period $T_2$. Thus, by using motion compensation, the non-stationary data is highly correlated in the spatial and temporal domain.

The filtering performance is improved by using prior field data with the motion compensation preprocessing. As discussed herein, classified adaptive error recovery classifies the error distribution. However, errors may be very hard to correct when the data is non-stationary data. The ability to correct errors is greatly improved using motion compensation preprocessing. The advantages of performing motion compensation preprocessing with the classified adaptive error recovery process include classification quality improvement, because there is a high correlation of temporal data. The spatial (pattern) classification and the spatial activity classification are also improved. Adaptive filtering is also improved due to the high correlation of temporal data by execution of motion compensation preprocessing.

Multiple Classification

In one embodiment, a multiple class may be used as a collection of specific values or sets of values used to describe at least two different characteristics of the target data. For example, a multiple class may be defined to be a combination of at least two different classes. For example, a multiple class may be defined to be a combination of an error class, a motion class, and a spatial class such as an ADRC class.

In one embodiment, the multiple class ID can be used as the memory address to locate the proper filter coefficients and other information that are used to determine or estimate the value of the target data. In one embodiment, a simple concatenation of different class IDs in the multiple class ID is used as the memory address.

Therefore, a multiple classification scheme is a way of classifying the target data with respect to more than one characteristic of the target data in order to more accurately determine or estimate the value of the target data.

An error class is a collection of specific values used to describe the various distribution patterns of erroneous data in the neighborhood of the target data. In one embodiment, an error class is defined to indicate which adjacent data to the target data is erroneous. An error class ID is a specific value within the error class used to describe a particular distribution pattern of erroneous data in the neighborhood of the target data. For example, an error class ID of "0" may be defined to indicate that there is no erroneous data to the left and to the right of the target data; an error class ID of "1" may be defined to indicate that the data to the left of the target data is erroneous, etc. A filter is a mathematical process, function or mask for selecting a group of data.

A motion class is a collection of specific values used to describe the motion characteristic of the target data. In one embodiment, the motion class is defined based on the different levels of motion of the block containing the target data, for example, no motion in the block, little motion in the block, or large motion in the block. A motion class ID is a specific value within the motion class used to indicate a particular level of motion quantity of the target data. For example, motion class ID of "0" may be defined to indicate no motion, motion class ID of "3" may be defined to indicate large motion.

Figure 2J:
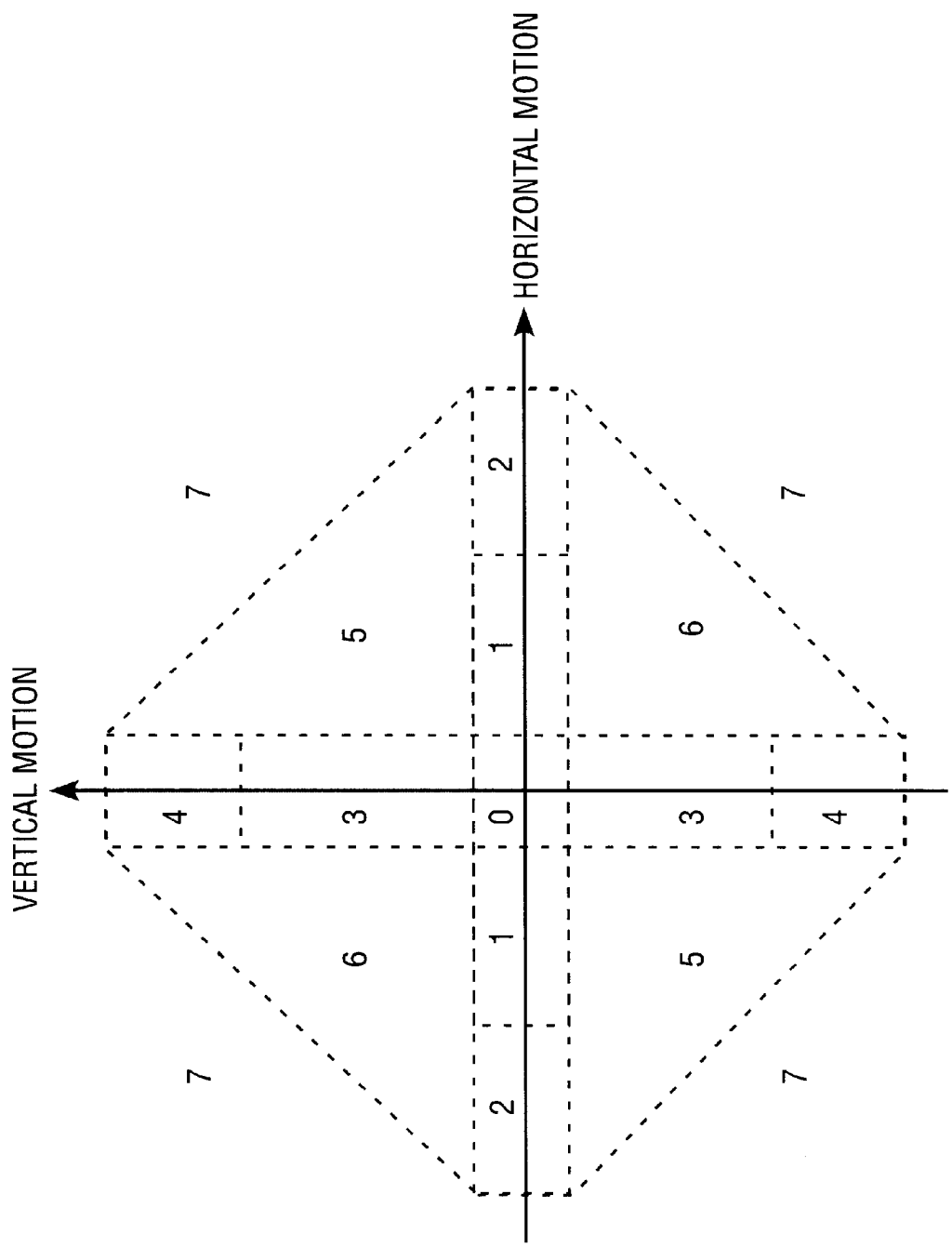

A motion vector class is a collection of specific values used to describe the directional motion characteristic of the target data. In one embodiment, the motion vector class is defined based on the different directions of motion of the block containing the target data, for example, vertical, horizontal, or diagonal. A motion vector class ID is a specific value within the motion vector class used to indicate a particular direction of motion of the target data. FIG. 2J shows an embodiment of motion vector class ID. For example, motion vector class ID of "1" may be defined to indicate small horizontal motion, motion vector class ID of "4" may be defined to indicate large vertical motion. Motion vector class "0" may define very little or no motion. Motion vector class "7" may define very fast motion without specifying a particular direction. The degradation for the very fast motion cannot be detected, therefore, a simple motion class such as "7" may be used.

FIG. 2J is only one example of possible motion vector classifications. The classifications may vary by size and shape of area corresponding to a particular value and/or number of possible classifications.

In this embodiment, a symmetrical structure is used to reduce the number of motion vector classifications, which reduces the number of filters. In alternative embodiments, non-symmetrical motion vector classifications may also be used. The vertical direction of the motion may correspond to a tilting object or a tilting picture. This kind of picture may be separated from the horizontal motion of the picture, especially for interlaced images. Thus, motion vector classification provides several advantages, including identification of the motion direction of an image, and the separation of tilting images from panning images and horizontally move objects from vertically moving objects. Consider a video camera looking at relatively stationary objects. The camera can be tilted up or down or panned left or right. That's analogous to a stationary camera and object, moving down or up (reversed) or right or left. The motion vector classification is also utilized in an adaptive filter tap structure based on the motion vector, and therefore may improve the estimation accuracy over motion classification alone.

A spatial class is a collection of specific values used to describe the spatial characteristic of the target data. For example, spatial classification of the data may be determined using Adaptive Dynamic Range Coding (ADRC), Differential Pulse Code Modulation (DPCM), Vector Quantization (VQ), Discrete Cosine Transform (DCT), etc. A spatial class ID is a specific value within the spatial class used to describe the spatial pattern of the target data in the group or block containing the target data.

For example, an ADRC class is a spatial class defined by the Adaptive Dynamic Range Coding method. An ADRC class ID is a specific value within the ADRC class used to describe the spatial pattern of the data distribution in the group or block containing the target data. A class is a collection of specific values used to describe certain characteristics of the target data. A variety of different types of classes exist, for example, a motion class, a spatial class, an error class, a spatial activity class, etc.

The present invention provides a method and apparatus for adaptive processing that generates data corresponding to a set of one or more data classes. This process is known as "classification". Classification can be achieved by various attributes of signal distribution. For example, Adaptive Dynamic Range Coding (ADRC) may be used for generation of each class as a spatial class, but it will be recognized by one of ordinary skill in the art that other classes, including a motion class, an error class, and a spatial activity class may be used with the present invention without loss of generality. A spatial activity class is a collection of specific values used to describe the spatial activity characteristic of the target data. For example, spatial activity classification of the data may be determined using the dynamic range, the standard deviation, the Laplacian value or the spatial gradient value. Some classification methods provide advantages which are desirable before restoration of a deteriorated signal takes place. For example, ADRC can achieve classification by normalizing each signal waveform automatically.

For each class, a suitable filter for signal restoration is prepared for the adaptive processing. In one embodiment, each filter is represented by a matrix of filter coefficients which are applied to the data. The filter coefficients can be generated by a training process, an example of which is described subsequently, that occurs as a preparation process prior to filtering. In one embodiment of the present invention, the filter coefficients can be stored in a random access memory (RAM), shown in FIG. 2A at 207.

A typical signal processing flow of the present invention is shown in FIG. 2A. Target input data 201 can be accompanied with error flag data 203. Error flag data can indicate locations within the data that contain erroneous pixels. In one embodiment of the present invention, an ADRC class is generated for each input target data in classification block 205, filter coefficients corresponding to each class ID are output from the coefficient memory block 207, and filtering is executed with input data 201 and the filter coefficients in the filter block 209. The filtered data may correspond to an error recovered result. In the selector block 211, switching between error recovered data and error free data occurs according to the error flag data 203.

In FIG. 2C, an example is shown where the number of class taps is four. In the case of 1-bit ADRC, 16 class IDs are available as given by [formula 3], shown below. ADRC is realized by [formula 2], shown below. Detecting a local dynamic range (DR) is given by [formula 1], shown below, $$DR = MAX - MIN + 1 \quad \text{[formula 1]}$$

$$q_i = \left\lfloor \frac{(x_i - MIN + 0.5) \cdot 2^Q}{DR} \right\rfloor \quad \text{[formula 2]}$$

$$c = \sum_{i=1}^{4} 2^{i-1} \cdot q_i \quad \text{[formula 3]}$$

where c corresponds to an ADRC class ID, DR represents the dynamic range of the four data area, MAX represents the maximum level of the four data, MIN represents the minimum level of the four data, $q_i$ is the ADRC encoded data, also referred to as a Q code, and Q is the number of quantization bits. The $\lfloor \cdot \rfloor$ operator represents a truncation operation.

In 1-bit ADRC, c may have a value from 0 to 15 with Q=1. This process is one type of spatial classification, but it will be recognized by one of ordinary skill in the art that other examples of spatial classification, including Differential PCM, Vector Quantization and Discrete Cosine Transform may be used with the present invention without loss of generality. Any method may be used if it can classify a target data distribution.

In the example shown in FIG. 2D, each adaptive filter has 12 taps. Output data is generated according to the linear combination operation given by [formula 4], shown below, $$y = \sum_{i=1}^{12} w_i \cdot x_i \qquad \text{[formula 4]}$$

where $x_i$ is input data, $w_i$ corresponds to each filter coefficient, and y is the output data after error recovery. Filter coefficients can be generated for each class ID by a training process that occurs prior to the error recovery process.

For example, training may be achieved according to the following criterion.

$$\min_w \|X \cdot W - Y\|_2 \qquad \text{[formula 5]}$$

where X, W, and Y are, for example, the following matrices: X is the input data matrix defined by [formula 6], W is the coefficient matrix defined by [formula 7], and Y corresponds to the target data matrix defined by [formula 8].

$$X = \begin{pmatrix} x_{11} & x_{12} & \cdots & x_{1n} \\ x_{21} & x_{22} & \cdots & x_{2n} \\ \vdots & \vdots & \ddots & \vdots \\ x_{m1} & x_{m2} & \cdots & x_{mn} \end{pmatrix} \qquad \text{[formula 6]}$$

$$W = \begin{pmatrix} w_1 \\ w_2 \\ \vdots \\ w_n \end{pmatrix} \qquad \text{[formula 7]}$$

$$Y = \begin{pmatrix} y_1 \\ y_2 \\ \vdots \\ y_m \end{pmatrix} \qquad \text{[formula 8]}$$

The coefficient $w_i$ can be obtained according to [formula 5], so that estimation errors against target data are minimized.

Figure 12:
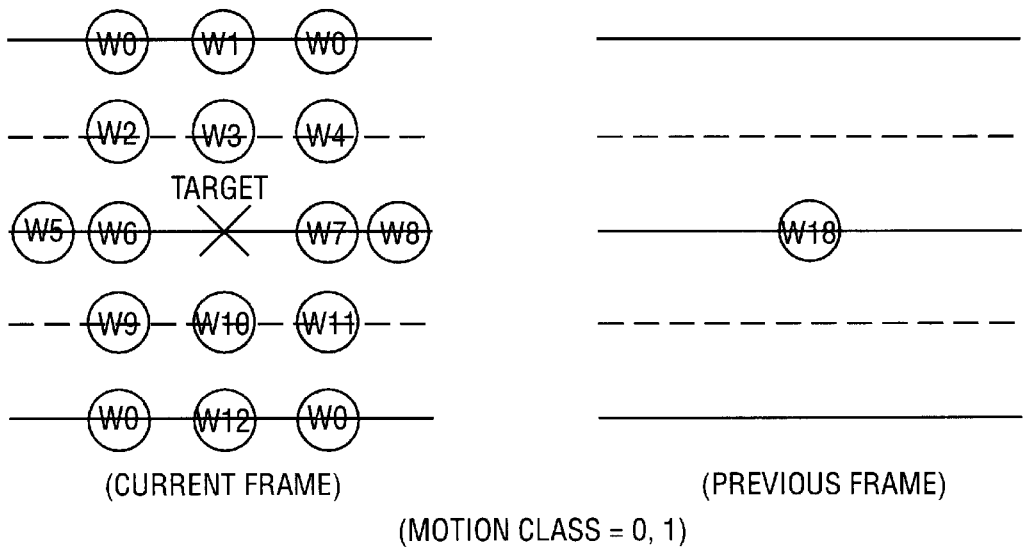
FIG. 12 shows a motion class adaptive filter tap (error class 0) compatible with an embodiment of the present invention.
Figure 12:
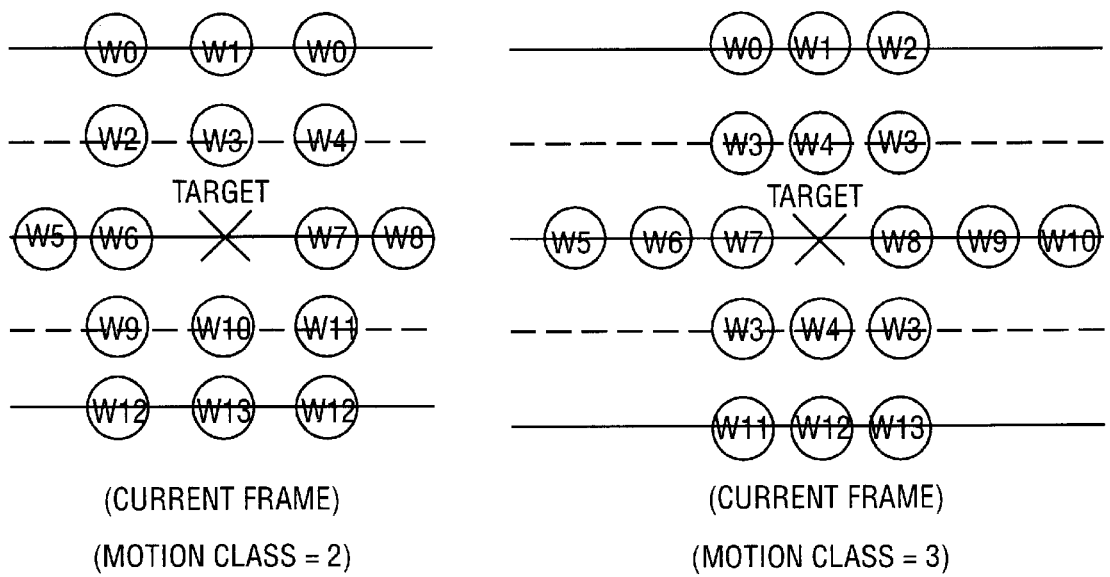

In the example shown in FIG. 2D, 12 coefficients regarding each ADRC class ID are determined by the training method described above.

A flow diagram of an embodiment of the present invention is shown in FIG. 2E. The flow chart of FIG. 2E shows the basic processing stream for generating an undeteriorated signal from the deteriorated input signal. At step 215, the preprocessing for a peripheral erroneous pixel is performed. At step 217, each classification regarding the deteriorated input signal is executed to generate a class ID. Some class taps are selected adaptively according to another class ID. Multiple classification may be executed, such as motion classification, error classification, spatial activity classification and spatial classification.

The classification scheme can be defined during system design, where the classification scheme, the number of classes, and other specification are decided for the target data. The design stage may include, among others, considerations of system performance and hardware complexity.

At step 219, multiple classification generates a multiple class ID with a plurality of class IDs which are generated by various classification at step 217. At step 221, filter taps are adaptively selected according to the multiple class ID which is generated at step 219. At step 223, the filter tap structure is adaptively expanded according to the multiple class ID which is generated at step 219. The number of filter coefficients that must be stored can be reduced by allocating the same coefficient to multiple taps. This process is referred to as filter tap expansion. At step 224, filter coefficients are selected according to the multiple class ID which is generated at step 219. At step 225, filtering with respect to the deteriorated input signal is executed to generate an undeteriorated signal. Filter coefficients are selected adaptively according to the multiple class ID which is generated in step 219.

In one embodiment of the present invention, a three dimensional ADRC process may be used to realize spatio-temporal classification, because simple waveform classifications such as a two dimensional ADRC process typically cannot structurally achieve separation for general motion pictures in the class of FIG. 2C. If both stationary and motion areas are processed in the same class ID, error recovery quality is degraded because of differences in characteristics of the two areas.

In another embodiment of the present invention, motion classification or motion vector classification, in addition to spatial classification, may also be used to provide compact definition of temporal characteristics. Further, multiple classification may be added to the classified adaptive error recovery method. For example, there are various types of classes, such as a motion class, a motion vector class, an error class, a spatial activity class and a spatial class explained above. The combination of one or more of these different classification methods can also improve classification quality.

Figure 3:
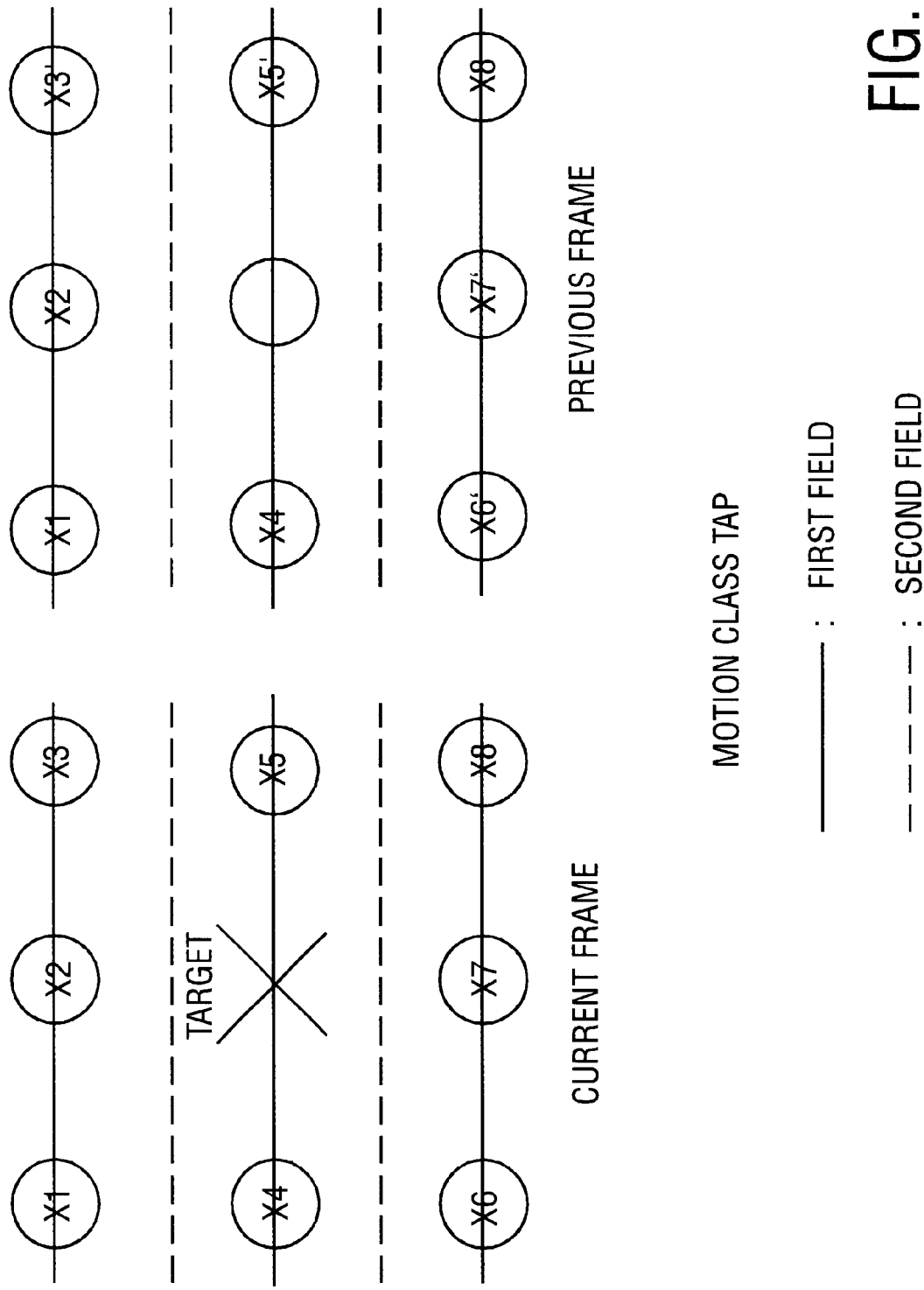
FIG. 3 shows a motion class tap compatible with an embodiment of the present invention.

FIG. 3 shows an example of motion class tap structures. [It would be helpful to include an example of motion vector class tap structure?]. The example shows eight taps in neighborhood of the target error data. In this example, the eight tap accumulated temporal difference can be evaluated according to [formula 9], shown below, and is classified to four kinds of motion classes by thresholding based on [formula 10], shown below. In one embodiment of the present invention, th0 is equal to 3, th1 is equal to 8, and th2 is equal to 24.

$$fd = \sum_{i=1}^{8} |x_i - x'_i| \qquad \text{[formula 9]}$$

$$mc = \begin{cases} 0 & (0 \le fd < th0) \\ 1 & (th0 \le fd < th1) \\ 2 & (th1 \le fd < th2) \\ 3 & (th2 \le fd) \end{cases} \qquad \text{[formula 10]}$$

In the above formulas, fd represents an accumulated temporal difference, $x_i$ represents motion class tap data of the current frame, $x_i$ represents the previous frame tap data corresponding to the current frame, and mc represents a motion class ID. Three thresholds, th0, th1, th2, can be used for this motion classification.

Figure 4:
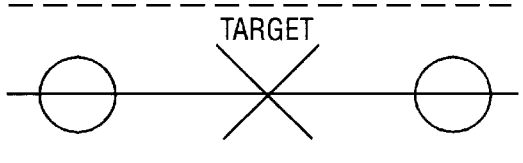
FIG. 4 shows an error class tap compatible with an embodiment of the present invention.
Figure 4:
Figure 4:
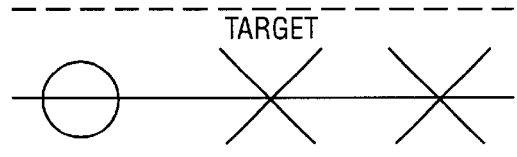
Figure 4:
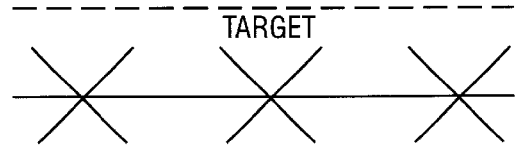

In one embodiment of the present invention, an error class can be used in conjunction with the classified adaptive error recovery method. This classification is achieved according to the erroneous data distribution pattern in neighborhood of the target data, examples of which are shown in FIG. 4. This example has four error classes: an independent error case, a left error case, a right error case, and a three consecutive error case.

Generally speaking, filter coefficients of pixels adjacent to the target data have larger weights for error recovery. The data adjacent to the error data has a significant impact on the result of error recovery. Error classes can reduce this influence by separating different characteristic areas to other classes according to the adjacent erroneous data distribution. For the example shown in FIG. 2C, ADRC classification generates 16 kinds of ADRC class IDs, where motion and error classification generate four kinds of class IDs, respectively. Thus, the number of class IDs equals 16×4×4, or 256. Classification may be realized by representing each signal characteristic. Multiple classification can define a suitable class, the class ID, regarding the erroneous target data by combining different classification characteristics.

Adaptive Class Tap Structure

Figure 5:
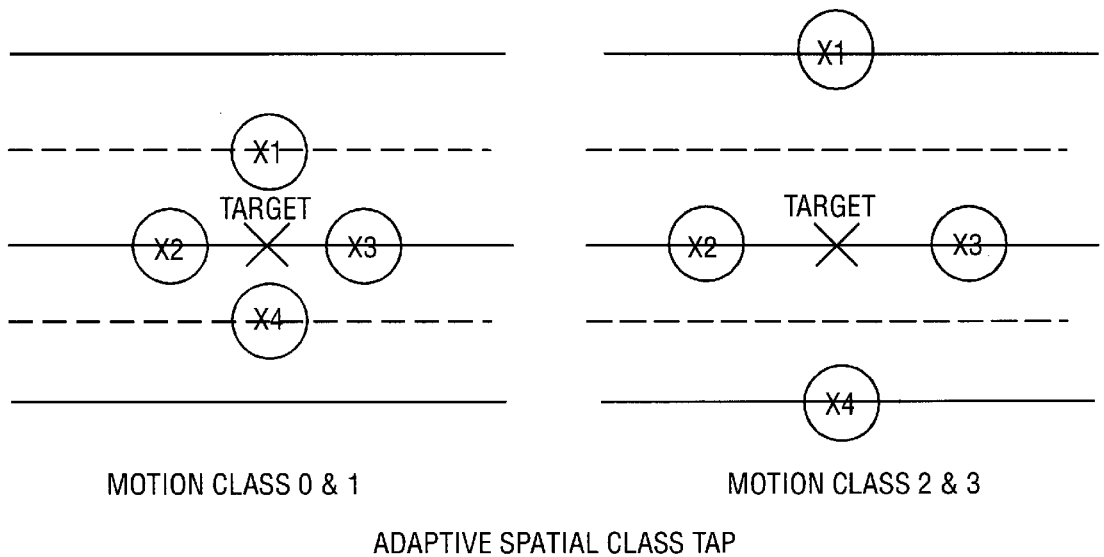
FIG. 5 shows an adaptive spatial class tap compatible with an embodiment of the present invention.
Figure 6:
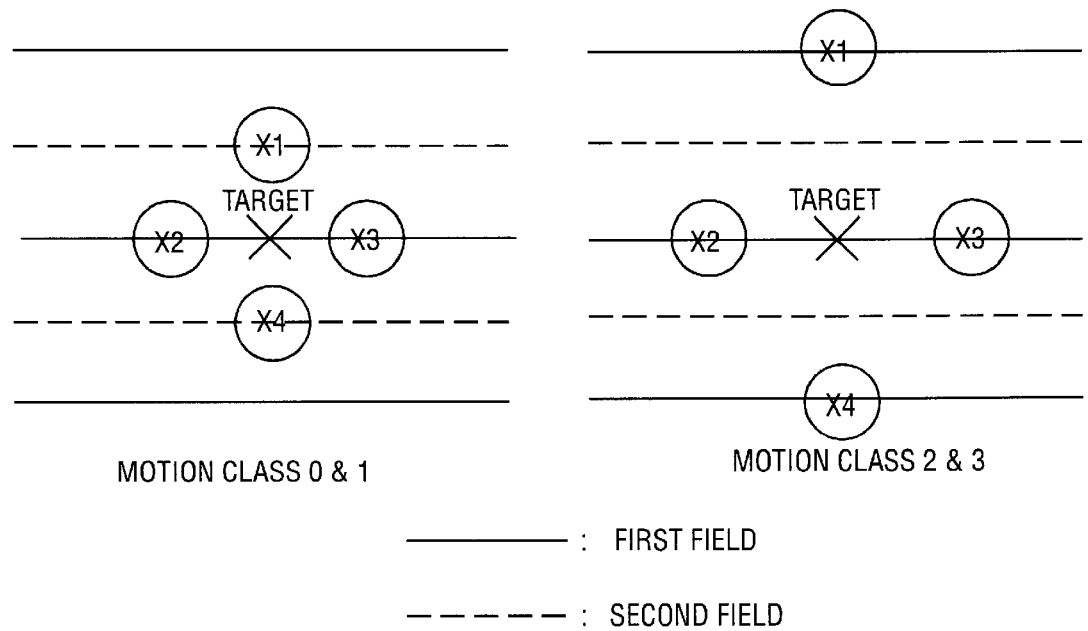
FIG. 6 shows an adaptive spatial class tap (error class 0) compatible with an embodiment of the present invention.
Figure 7:
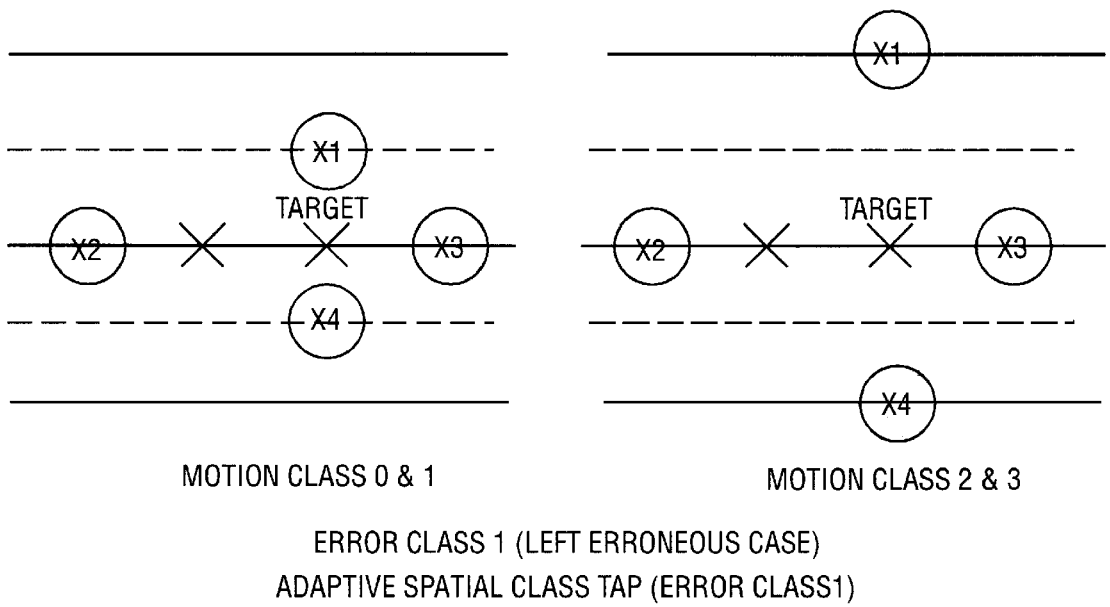
FIG. 7 shows an adaptive spatial class tap (error class 1) compatible with an embodiment of the present invention.
Figure 8:
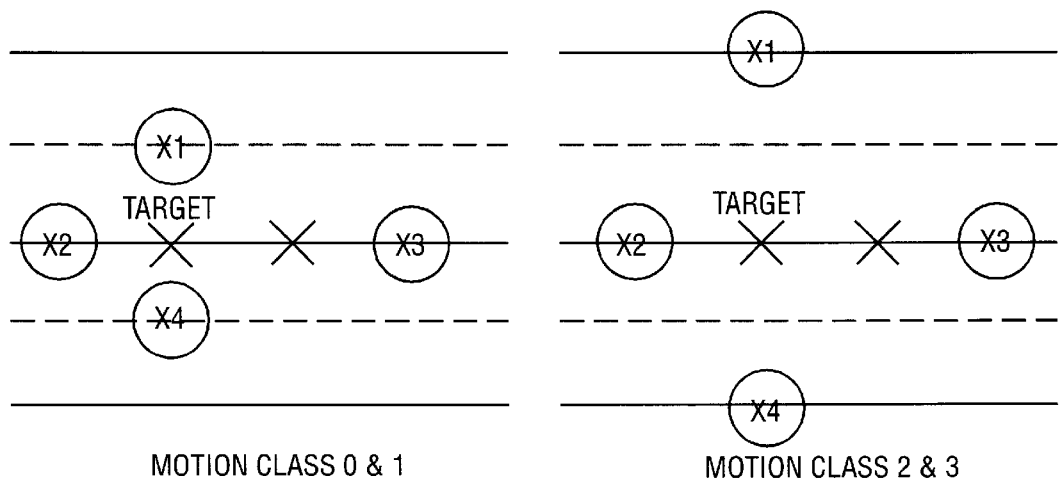
FIG. 8 shows an adaptive spatial class tap (error class 2) compatible with an embodiment of the present invention.
Figure 9:
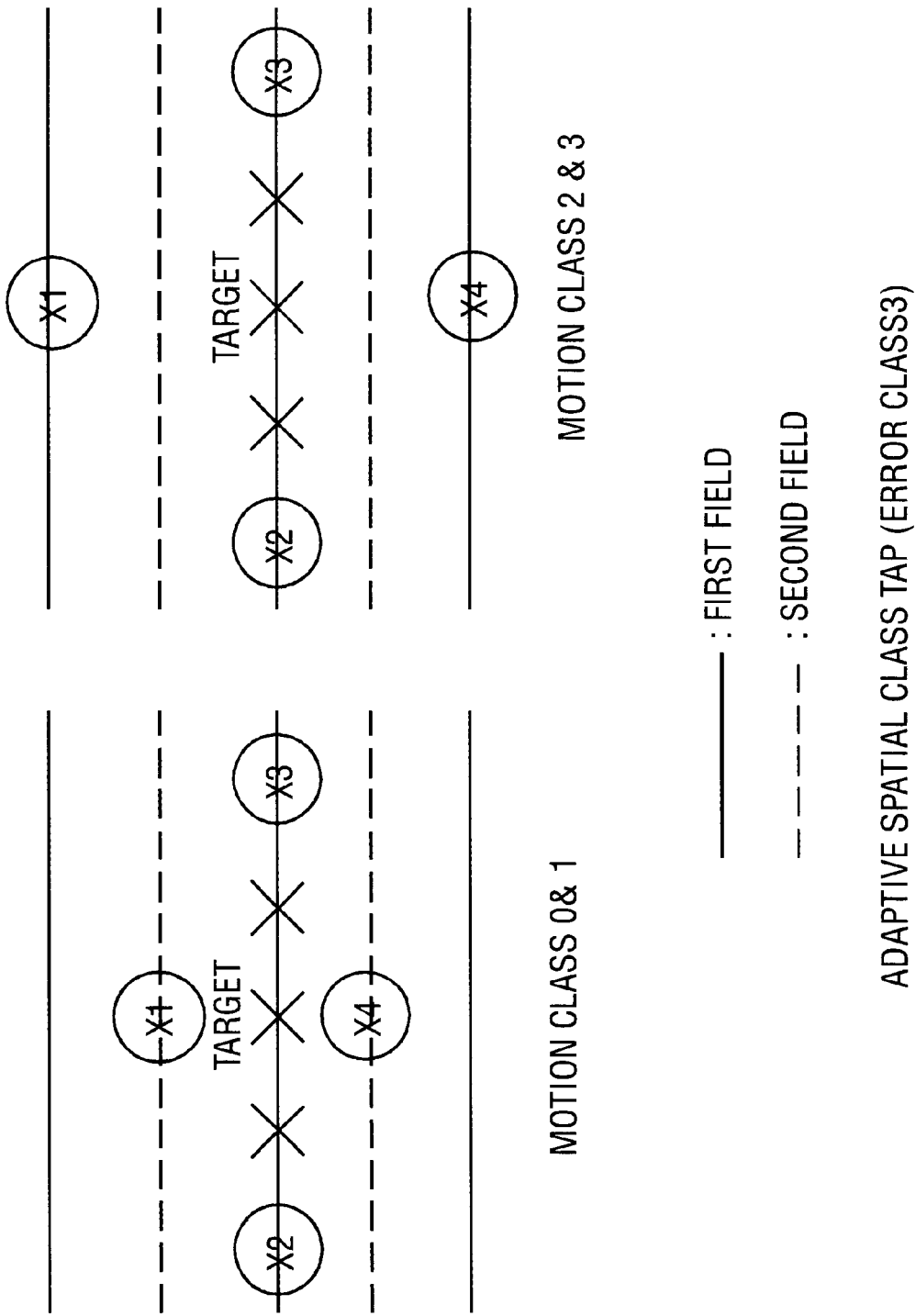
FIG. 9 shows an adaptive spatial class tap (error class 3) compatible with an embodiment of the present invention.

In one embodiment of the present invention, an adaptive class tap structure can be used in conjunction with the classified adaptive error recovery method. FIG. 5 shows one example of motion class adaptive spatial class tap structures. Intra-frame taps can be chosen in a stationary or a slow motion area. Intra-field taps are typically used for larger motion areas. Suitable spatial classification is achieved by this adaptive processing.

For example, if intra-frame taps are used for large motion area classification, then the generated class distribution may vary widely because of low correlation, and therefore it will be difficult to represent the target data characteristics properly. An adaptive class tap structure, such as that shown in FIG. 5, is therefore effective.

Additional examples are shown in FIGS. 6, 7, 8, 9. Spatial class taps are typically selected according to a motion and an error class. In addition to the motion factor, the erroneous data distribution is taken into account for the spatial class tap definition. The neighboring erroneous data is typically not introduced to the spatial classification. By this definition, only valid data is used and the classification accuracy is improved.

Adaptive Filter Tap Structure

Figure 10:
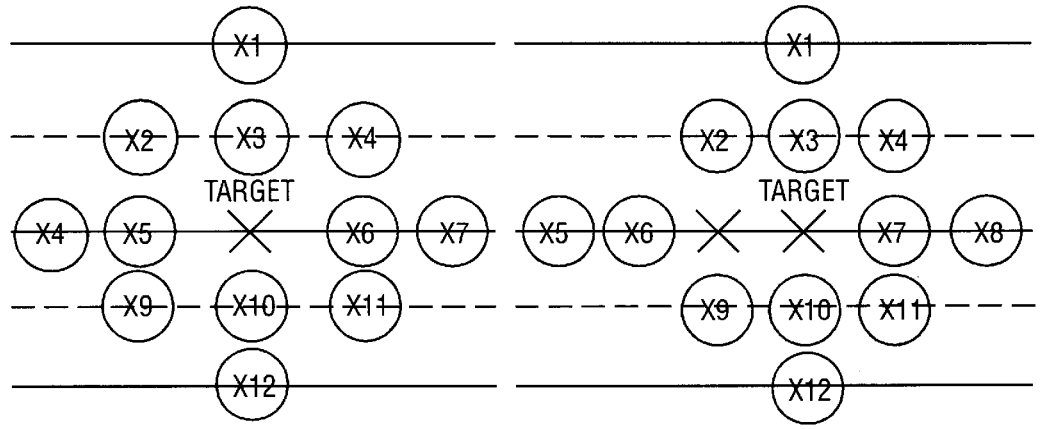
FIG. 10 shows an adaptive filter tap compatible with an embodiment of the present invention.
Figure 10:
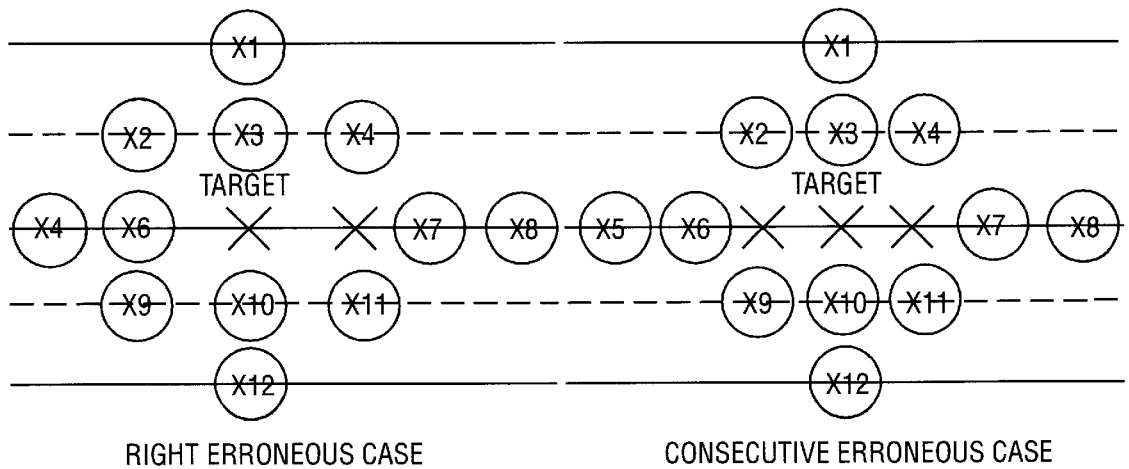

In one embodiment of the present invention, an adaptive filter tap structure based on a corresponding class can be used in conjunction with the classified adaptive error recovery method. FIG. 10 shows one example of an adaptive filter tap structures based on an error class. The filter tap structure regarding the target data is typically defined adaptively, preferably avoiding damaged data in neighborhood. Damaged data is not chosen for filtering.

Figure 11:
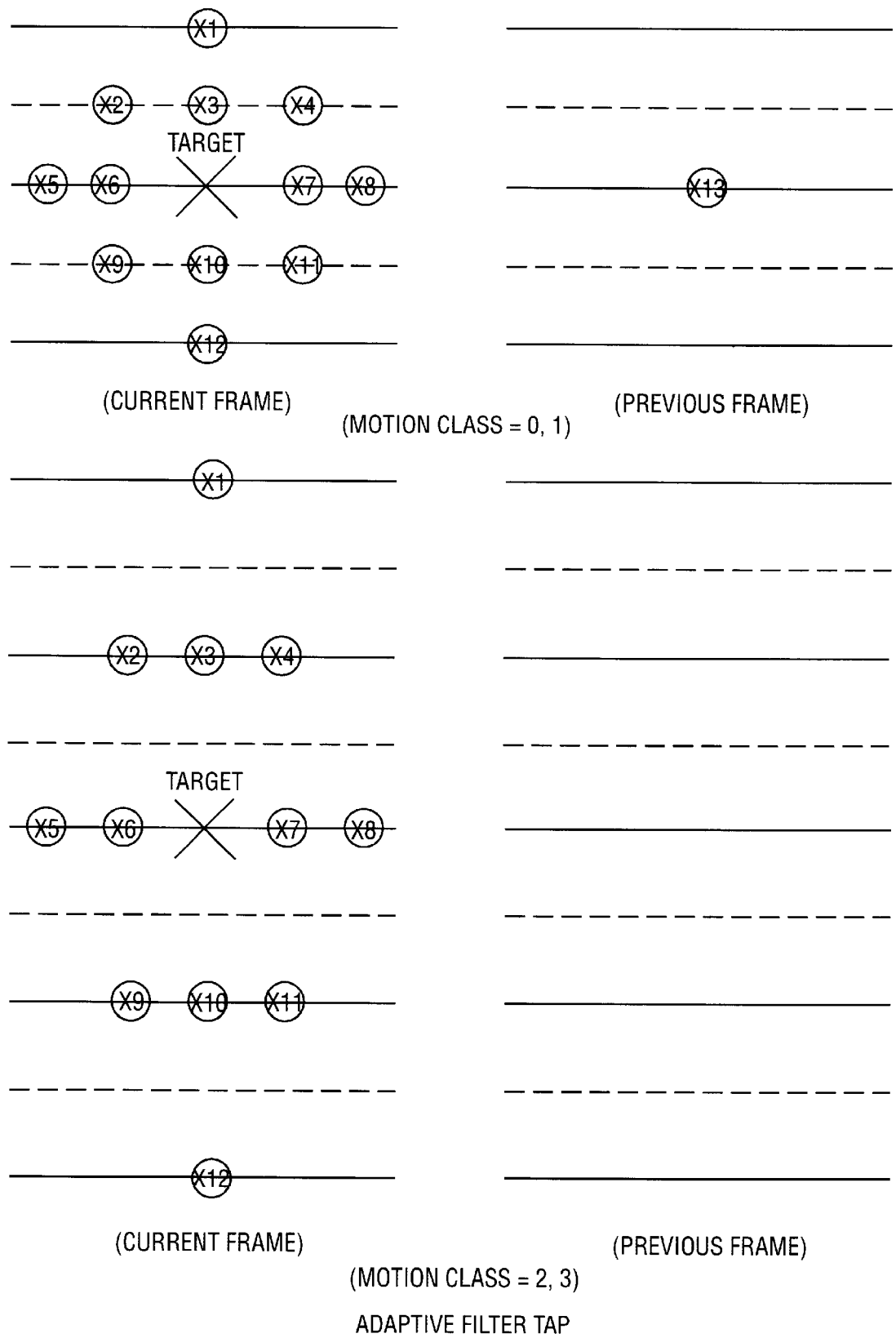
FIG. 11 shows a motion class adaptive filter tap compatible with an embodiment of the present invention.

An adaptive filter tap structure can be also defined according to motion class, an example of which is shown in FIG. 11. In the motion class example shown in FIG. 10, motion class 0 corresponds to stationary areas, but motion class 3 corresponds to large motion areas. Motion classes 1 and 2 correspond to intermediate motion areas.

For stationary or quasi-stationary class areas, intra-frame taps are used as shown in FIG. 11. At the same time, previous frame data at the target data location may be used for error recovery filtering. These areas correspond to motion class 0 and 1. For fast motion or moderate motion areas, each filter typically has an intra-field taps structure, which is also shown in FIG. 11. As shown by the example in FIG. 11, previous frame data is not introduced, and thus weakly correlated data is ignored. Filtering quality is typically improved by intra-field taps in such cases.

Figure 13:
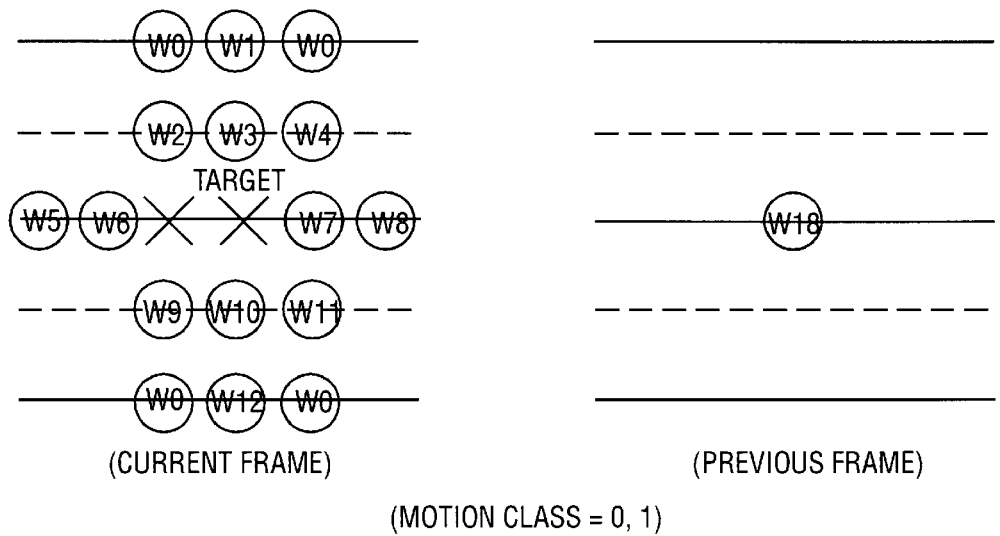
FIG. 13 shows a motion class adaptive filter tap (error class 1) compatible with an embodiment of the present invention.
Figure 13:
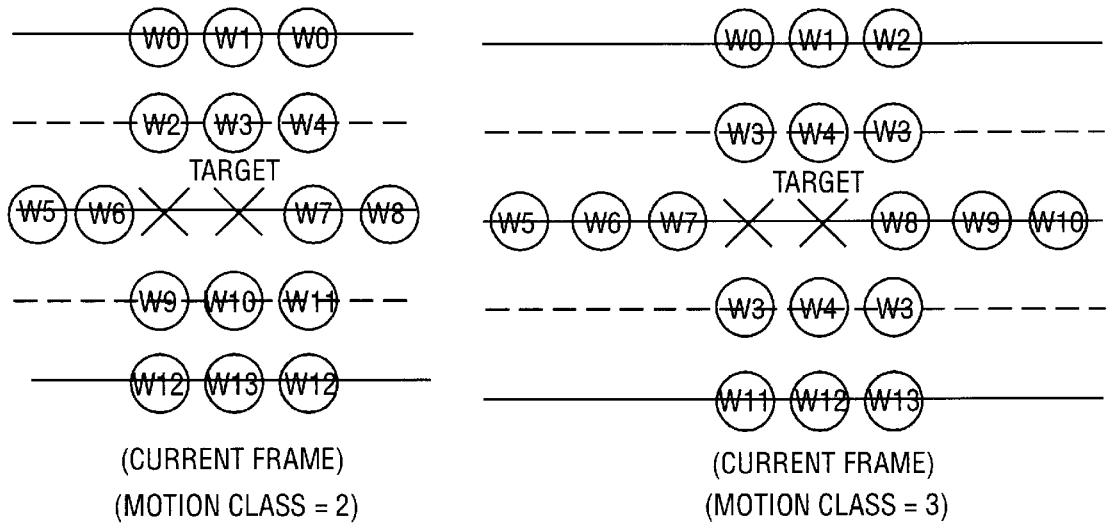
Figure 14:
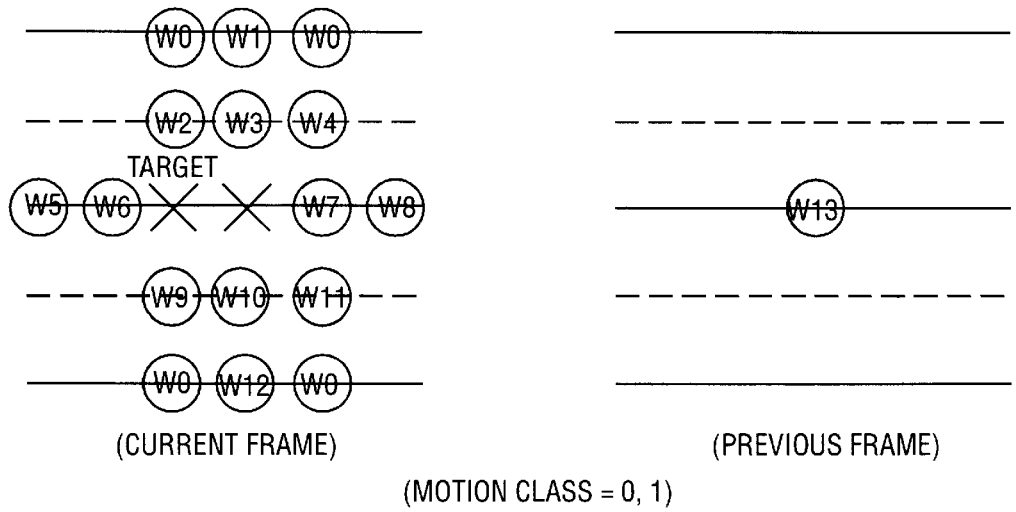
FIG. 14 shows a motion class adaptive filter tap (error class 2) compatible with an embodiment of the present invention.
Figure 14:
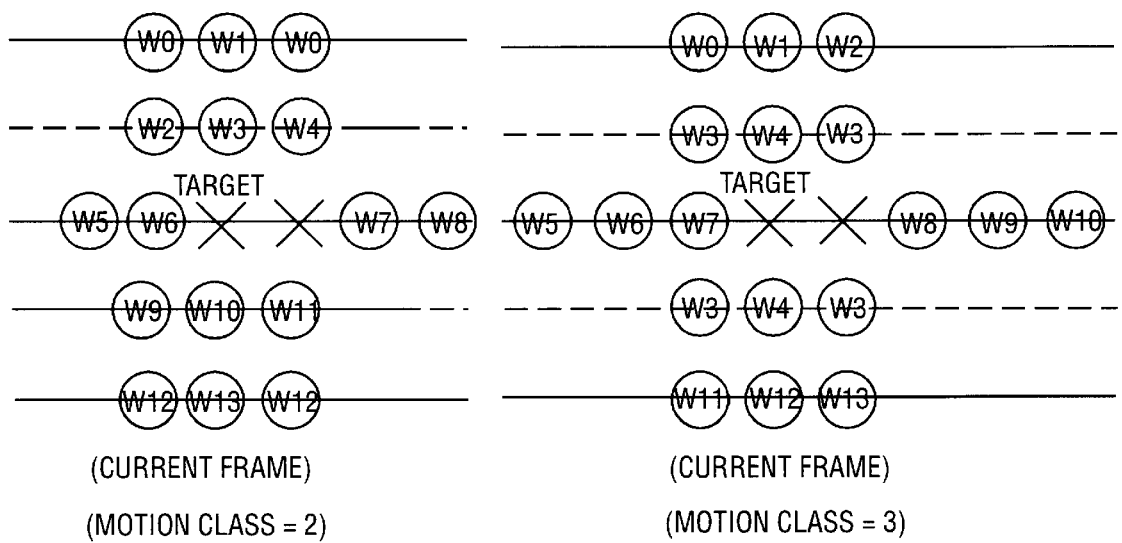
Figure 15:
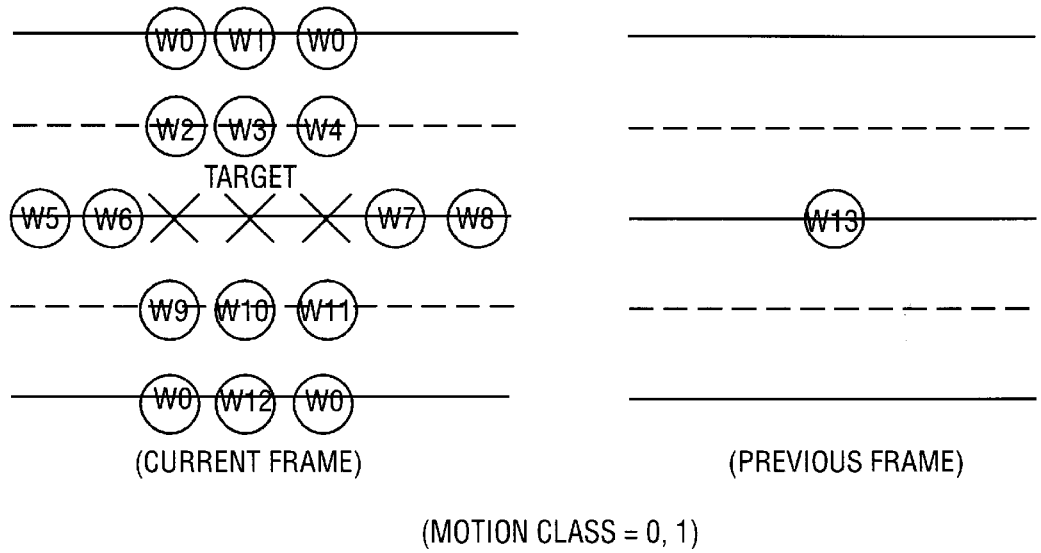
FIG. 15 shows a motion class adaptive filter tap (error class 3) compatible with an embodiment of the present invention.
Figure 15:
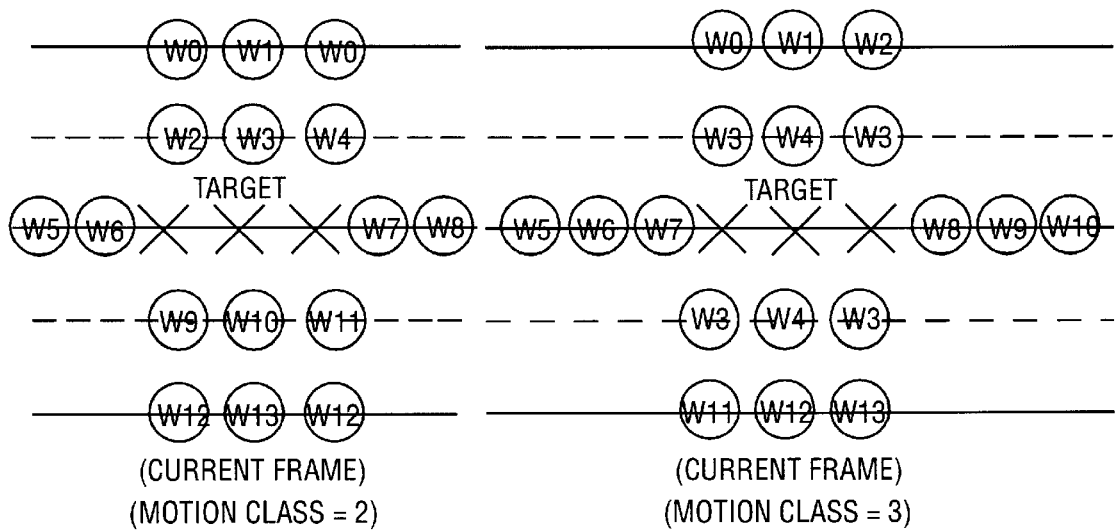

FIG. 12 shows an example of motion and error class adaptive filter tap structures. FIGS. 10 and 11 represent error and motion class adaptive filter taps, respectively. The example shown in FIG. 12 illustrates both adaptive structures with error class0, which is the independent error case. Upper adaptive characteristics are also shown in this example. In a manner similar to that of FIG. 12, FIG. 13 corresponds to error class 1, FIG. 14 corresponds to error class 2 and FIG. 15 corresponds to error class 3.

Filter Tap Expansion

In one embodiment of the present invention, filter tap expansion by allocating the same coefficient to plural taps can be used in conjunction with the classified adaptive error recovery method. Filter tap expansion is also shown by the structures in FIGS. 12–15. For example, the filter tap structure has four of the same coefficient taps with motion class 3 in FIG. 12. According to the evaluation results, some tap coefficients can be replaced with the same coefficient. The example shown in FIG. 12 has four W3 coefficients that are allocated at horizontally and vertically symmetric locations. By this expansion, 14 coefficients can cover 18 tap areas. This reduction method can typically reduce the need for coefficient memory and filtering hardware such as adders and multipliers. In one embodiment of the present invention, the expansion tap definition may be achieved by evaluation of coefficient distribution and visual results.

Preprocessing For Peripheral Erroneous Data

In one embodiment of the present invention, preprocessing for peripheral erroneous data can be used in conjunction with the classified adaptive error recovery method. To achieve error recovery filtering, suitable data is necessary at peripheral error locations of filter taps.

Figure 16:
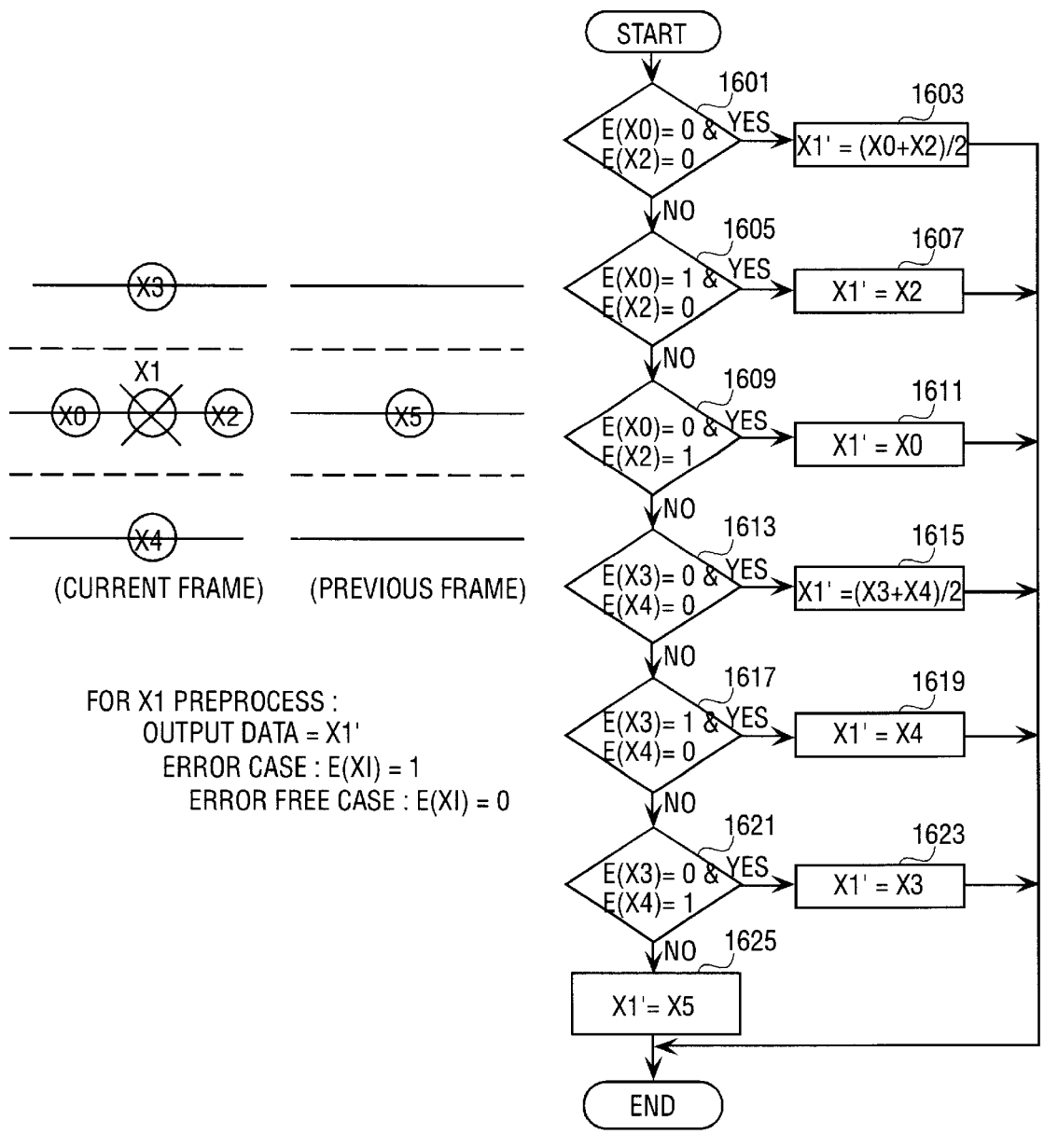
FIG. 16 shows a preprocessing algorithm compatible with an embodiment of the present invention.

One example of this preprocessing is shown by the flow diagram of FIG. 16. If at steps 1601, 1605, or 1609 there is erroneous data at a peripheral location of the target data, at steps 1603, 1607, 1611 the erroneous data is replaced with horizontal processed data in the case of no horizontal errors. If at steps 1613, 1617, or 1621 there are three consecutive horizontal errors, at steps 1615, 1619, or 1623 vertical processing is applied for generating preprocessed data. In all erroneous cases around the intra-frame data of this example, previous frame data is introduced for error processing, at step 1625.

Figure 17:
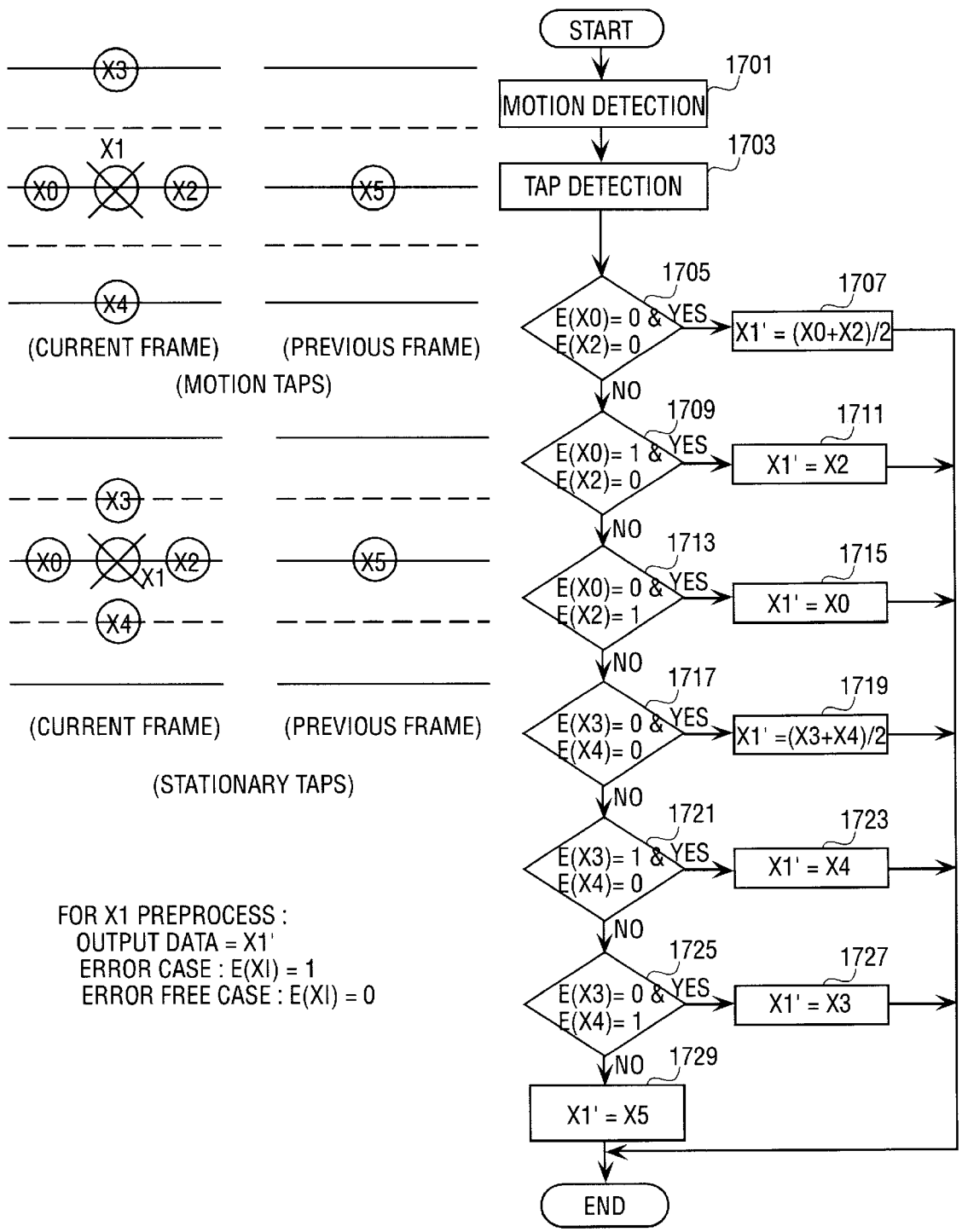
FIG. 17 shows a motion tap and stationary tap preprocessing algorithm compatible with an embodiment of the present invention.

FIG. 17 shows another preprocessing example that uses a motion adaptive process for preprocessing. Using error free data, motion quantity is detected at the motion detection step 1701. Generally speaking, an averaged motion quantity is calculated by averaging summed motion quantity with the number of error free data at the next step. Motion or stationary taps are chosen at step 1703 according to a threshold value of the result of averaged motion quantity. After these steps, processing steps 1705 through 1729 are performed in a manner similar to steps 1601 through 1625 of FIG. 16. The preprocessed data is generated according to these prioritized processes, and is introduced for error recovery filtering.

Spatial Class Reduction

In one embodiment of the present invention, spatial class reduction can be used in conjunction with the classified adaptive error recovery. As explained above, an ADRC class can be used for the spatial classification, given by [formula 3]. This has 16 kinds of class IDs in the definition of a 4 tap ADRC. These 16 class IDs can be reduced to eight kinds of class IDs according to [formula 11], shown below, $$c = \begin{cases} \sum_{i=1}^{4} 2^{i-1} \cdot q_i & (c < 2^3) \\ 2^4 - 1 - \sum_{i=1}^{4} 2^{i-1} \cdot q_i & (c \geq 2^3) \end{cases} \quad \text{[formula 11]}$$

where c corresponds to the ADRC class ID, $q_i$ is the quantized data and Q is the number of quantization bits based on [formula 1] and [formula 2].

Figure 20:
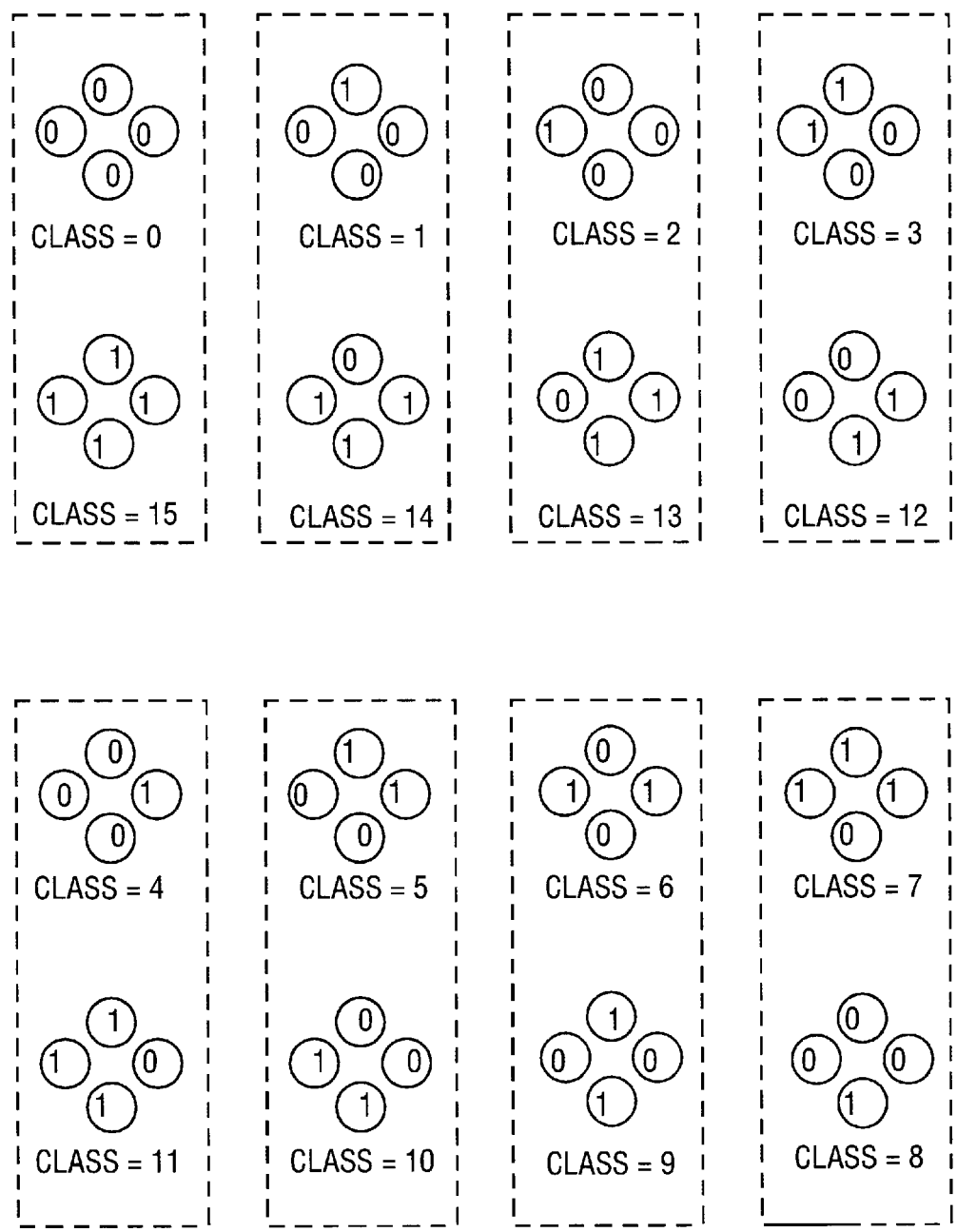
FIG. 20 shows an ADRC class reduction based on a 4-tap 1-bit ADRC compatible with an embodiment of the present invention.
Figure 21:
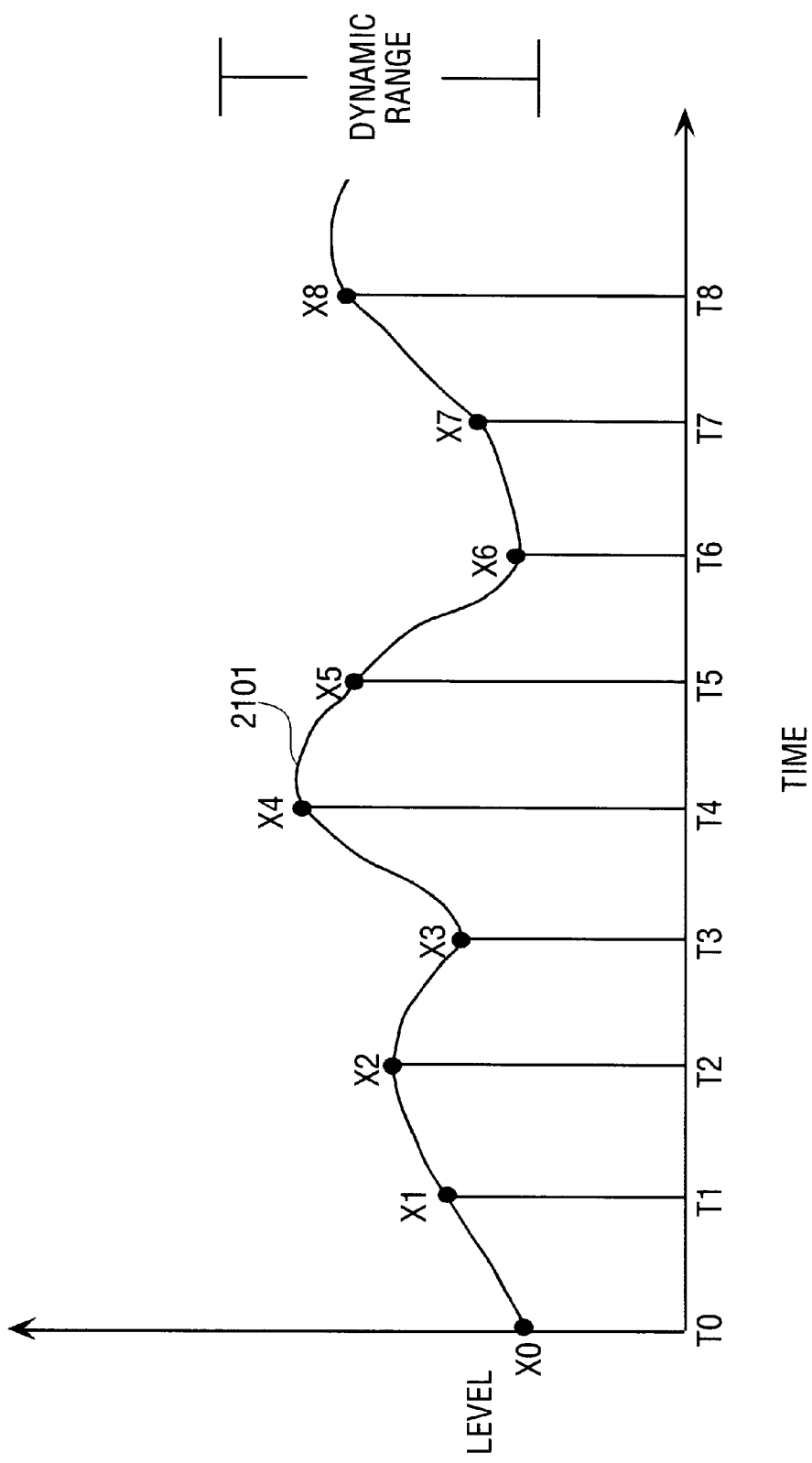

In one embodiment of the present invention, [formula 11] corresponds to a 1's complement operation in binary data of the ADRC code. This is related to the symmetric characteristics of each signal waveform. Because ADRC classification is a normalization of the target signal waveform, two waveforms which have the relation of 1's complement in each ADRC code can be classified in the same class ID. ADRC class IDs can typically be halved by this reduction process. An ADRC class reduction based on a 4-tap 1-bit ADRC is shown in FIG. 20. In this example, applying [formula 11] gives eight ADRC class pairs. Each pair contains spatial symmetric patterns, and therefore the number of ADRC class IDs can be reduced by half by taking advantage of these symmetric patterns. The spatial class reduction technique can also be applied to other spatial classification techniques, including but not limited to DPCM and Block Truncation Coding (BTC).

System Structure

Figure 18A:
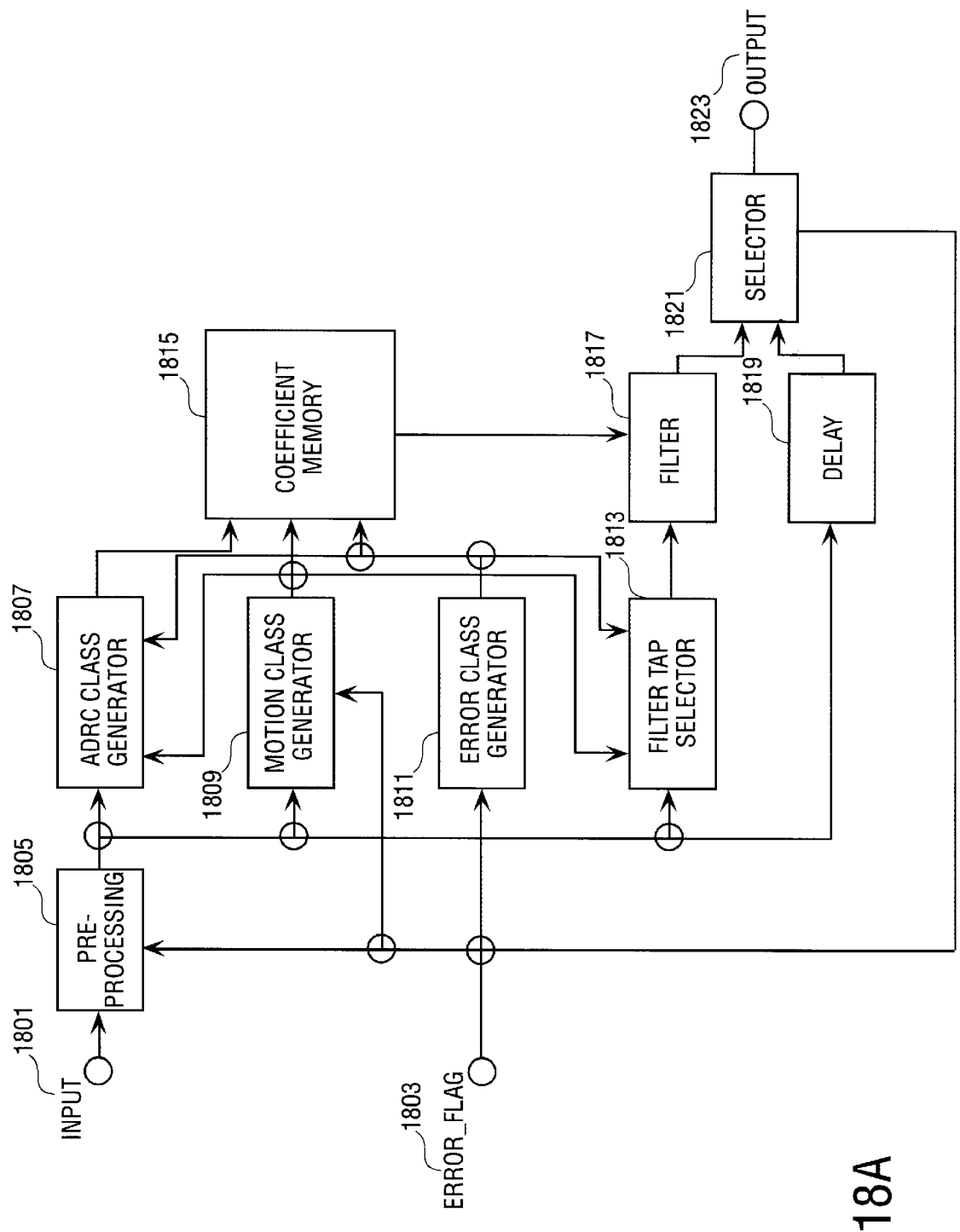
FIGS. 18A and 18B show system block diagrams compatible with an embodiment of the present invention.

An overall system structure for one embodiment of the present invention, including all the processes described above, is shown in FIG. 18A. Input data 1801 and corresponding error flags 1803 are input to the system. Examining the error flags 1803, the input data 1801 is preprocessed at 1805. ADRC classification is performed at 1807, motion vector classification is performed at 1809, and error classification is performed at 1811.

In this example, ADRC class taps are chosen adaptively according to the error motion vector class. Filter tap data are chosen at 1813 based on the error and motion vector class. Error recovery filtering is performed at 1817 with tap data and filter coefficients selected from the coefficient memory 1815 corresponding to the ADRC class ID of 1807, the motion vector class ID of 1809 and the error class ID of 1811. Error recovered data and error free input data 1817 are selected at 1821 according to the error flag 1803, which produces the output data 1823 of this system.

Figures 18B, 19:
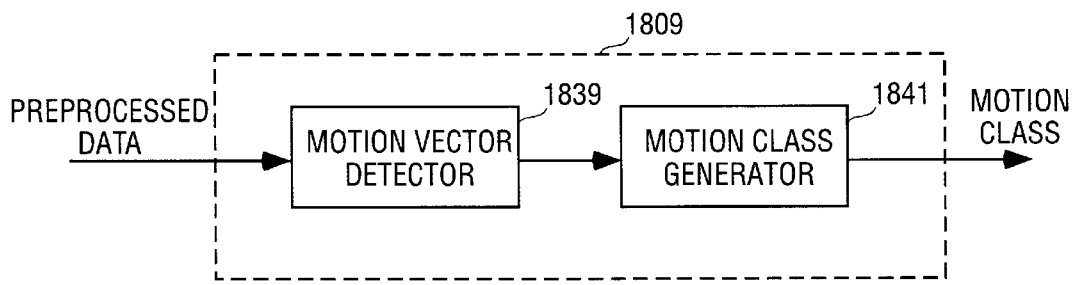
FIG. 19 shows coefficient memory contents compatible with an embodiment of the present invention.

FIG. 18B shows an embodiment of a motion vector class generator 1809. Motion vector detector 1839 detects the motion vector using conventional methods such as the block matching method described above, for example. The motion vector is detected for the target data. Using the motion vector generated, the motion class generator 1841 may identify the vector as a 3 bit quantized characteristic for the motion vector, as shown in FIG. 2J, for example. The quantized data therefore may represent the motion vector class data that is used to access the coefficient memory 1815. The estimation performance in the error recovery processing can be greatly improved by using the motion vector classification.

FIG. 19 shows an example of coefficient memory contents. It has 4×4×8 or 128 class IDs according to the multiple classification scheme. Four categories are used for an error class, four categories are for a motion class, and eight categories are for an ADRC class, which are typically halved according to [formula 11]. Each class corresponds to each memory address in FIG. 19. In this example, 14 coefficients are stored in each class ID address according to the filter definition, like FIGS. 12, 13, 14, 15.

Figure 21:
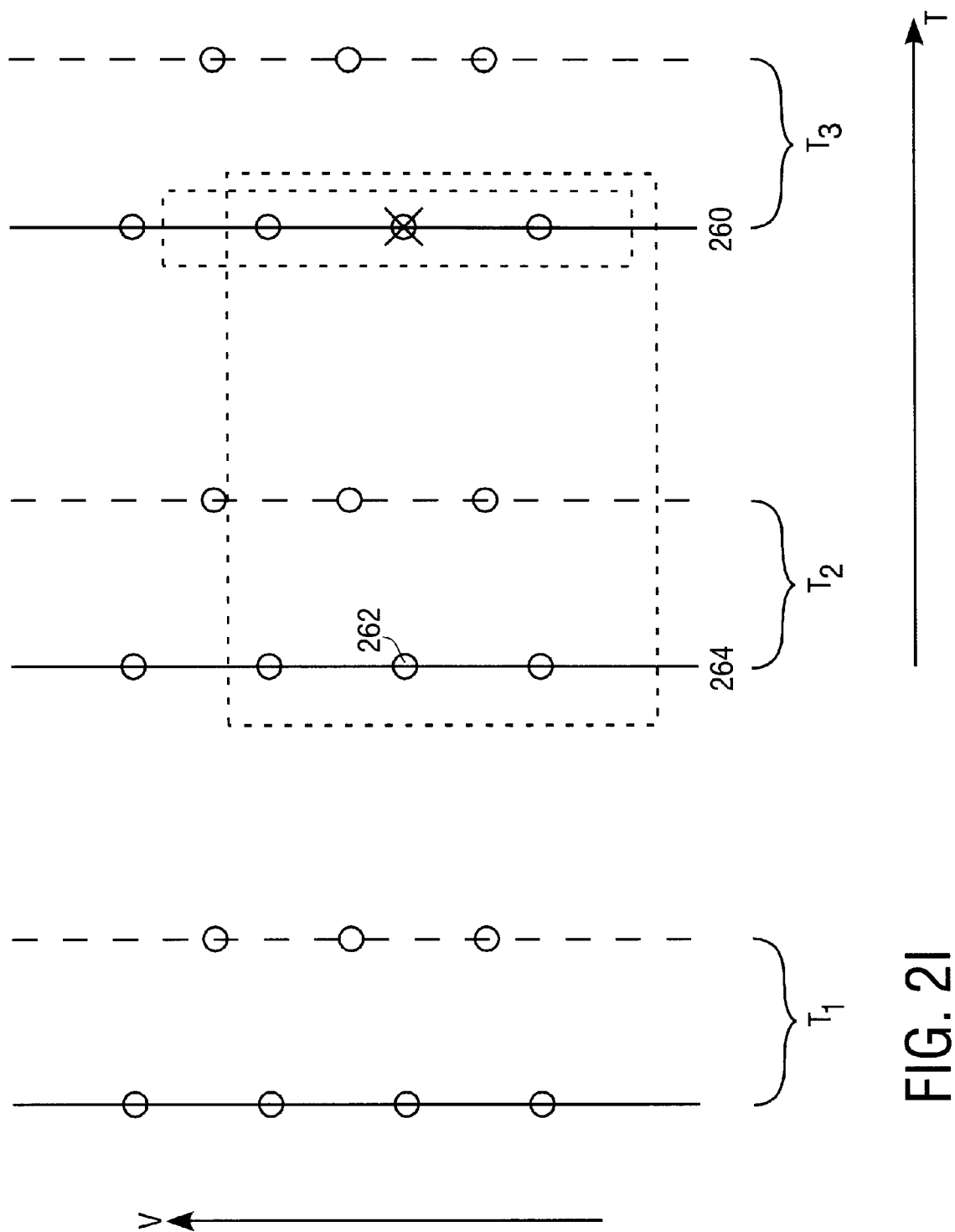
FIG. 21 shows an example of audio signal adaptive classification compatible with an embodiment of the present invention.

The present invention may be used with any form of correlated data, including without limitation photographs or other two-dimensional static images, holograms, or other three-dimensional static images, video or other two-dimensional moving images, three-dimensional moving images, a monaural sound stream, or sound separated into a number of spatially related streams, such as stereo. FIG. 21 shows an example of audio signal adaptive classification compatible with the present invention. An example audio signal 2101 is monitored at one or more time points t0–t8. The level of the audio signal 2101 at time points t0–t8 is given by tap points X0–X8. The dynamic range of the audio signal 2101 is given as the difference between the lowest level tap point X0 and the highest level tap point X4. In case of error recovery for erroneous data at t4, multiple classification can be applied with spatial classification like ADRC classification and spatial activity classification like dynamic range classification. Dynamic range classification is performed by thresholding the dynamic range in a manner similar to the motion classification processing of [formula 10]. As described above, motion classification, error classification and spatial classification are referred to in multiple classification. Spatial activity classification can also be introduced to multiple classification for general applications such as video data. In addition to dynamic range, the standard deviation, the Laplacian value or the spatial gradient value can be introduced for spatial activity classification.

With the present invention, the quality of data that is recovered due to errors is improved by introducing the disclosed technologies to the classified adaptive error recovery method. The present invention provides a way to restore a deteriorated signal to an undeteriorated signal which minimizes degradations on changing data.

While the invention is described in terms of embodiments in a specific system environment, those of ordinary skill in the art will recognize that the invention can be practiced, with modification, in other and different hardware and software environments within the spirit and scope of the appended claims.

What is claimed is:

1. A method for restoring a deteriorated input signal comprising:
   selecting a data point of the deteriorated input signal;
   classifying the data point with respect to a plurality of class types wherein one of the plurality of class types is a motion vector class;
   creating a multiple classification result according to the plurality of class types, wherein one of the plurality of class types is a motion vector class;
   selecting at least one filter coefficient according to the multiple classification result;
   creating an undeteriorated data by filtering the data with the at least one filter coefficient selected.

2. The method of claim 1 wherein the motion vector classification result is created by detecting a motion vector of the deteriorated input signal and generating a quantized characteristic for the motion vector.

3. The method of claim 2 wherein detecting comprises comparing target data of the deteriorated input signal to temporally neighboring data to determine an amount of change between data indicative of a motion vector.

4. The method of claim 2 wherein detecting comprises execution of a process selected from the group comprising block matching, phase correlation and gradient descent.

5. The method of claim 1 wherein the plurality of class types is selected from the group comprising a spatial class, an Adaptive Dynamic Range Coding (ADRC) class, a Differential Pulse Code Modulation (DPCM) class, a Vector Quantization (VQ) class, a Discrete Cosine Transform (DCT) class, a motion class, a spatial activity class, an error class, a dynamic range class, a Laplacian class, a standard deviation class and a spatial gradient class.

6. A method of recovering deteriorated data points comprising:

receiving a stream of data points having spatial-temporal correlation;

selecting a deteriorated target data point from the stream;

classifying the target data point based upon multiple class types to create a multiple classification result, said multiple class types including a motion vector class; and estimating a recovered data point for the target data based on the multiple classification result.

7. The method of claim 6 wherein the motion vector classification result is created by detecting a motion vector of the deteriorated input signal and generating a quantized characteristic for the motion vector.

8. The method of claim 7 wherein the step of detecting comprises comparing target data of the deteriorated input signal to temporally neighboring data to determine an amount of change between data indicative of a motion vector.

9. The method of claim 7 wherein the step of detecting comprises execution of a process selected from the group comprising block matching, phase correlation and gradient descent.

10. The method of claim 6, wherein the estimating the recovered target data point comprises:

selecting, based on the multiple classification result, at least one filter coefficient;

selecting at least one tap data point having a spatial-temporal relationship to the target data point; and filtering the at least one tap data point according to the at least one filter coefficient.

11. An apparatus for restoring a deteriorated input signal comprising:

a selector configured to select a data point of the deteriorated input signal;

a classifier configured to classify the data point with respect to a plurality of class types wherein one of the plurality of class types is a motion vector class, to create a multiple classification result according to the plurality of class types, wherein one of the plurality of class types is a motion vector class, and to select at least one filter coefficient according to the multiple classification result;

a filter configured to create an undeteriorated data by filtering the data with the at least one filter coefficient selected.

12. The apparatus of claim 11 wherein the classifier is further configured to create the motion vector classification result by detecting a motion vector of the deteriorated input signal and generating a quantized characteristic for the motion vector.

13. The apparatus of claim 12 wherein the classifier is configured to detect by comparing target data of the deteriorated input signal to temporally neighboring data to determine an amount of change between data indicative of a motion vector.

14. The apparatus of claim 12 wherein the classifier is configured to detect by executing a process selected from the group comprising block matching, phase correlation and gradient descent.

15. The apparatus of claim 11 wherein the plurality of class types is selected from the group comprising a spatial class, an Adaptive Dynamic Range Coding (ADRC) class, a Differential Pulse Code Modulation (DPCM) class, a Vector Quantization (VQ) class, a Discrete Cosine Transform (DCT) class, a motion class, a spatial activity class, an error class, a dynamic range class, a Laplacian class, a standard deviation class and a spatial gradient class.

16. An apparatus for recovering deteriorated data points comprising:

a receiver configured to receive a stream of data points having spatial-temporal correlation;

a selector configured to select a deteriorated target data point from the stream;

a classifier configured to classify the target data point based upon multiple class types to create a multiple classification result, said multiple class types including a motion vector class; and an estimator configured to estimate a recovered data point for the target data based on the multiple classification result.

17. The apparatus of claim 16 wherein the motion vector classification result is created by the classifier by detecting a motion vector of the deteriorated input signal and generating a quantized characteristic for the motion vector.

18. The apparatus of claim 17 wherein the classifier detects by comparing target data of the deteriorated input signal to temporally neighboring data to determine an amount of change between data indicative of a motion vector.

19. The method of claim 17 wherein the step of detecting comprises execution of a process selected from the group comprising block matching, phase correlation and gradient descent.

20. The apparatus of claim 16, wherein the estimator is configured to estimate the recovered target data point by selecting, based on the multiple classification result, at least one filter coefficient;

selecting at least one tap data point having a spatial-temporal relationship to the target data point; and filtering the at least one tap data point according to the at least one filter coefficient.

21. A computer readable medium containing executable instructions, which, when executed in a processing system, causes the system to perform the steps of restoring a deteriorated input signal, comprising the steps of:

selecting a data point of the deteriorated input signal;

classifying the data point with respect to a plurality of class types wherein one of the plurality of class types is a motion vector class;

creating a multiple classification result according to the plurality of class types, wherein one of the plurality of class types is a motion vector class;

selecting at least one filter coefficient according to the multiple classification result;

creating an undeteriorated data by filtering the data with the at least one filter coefficient selected.

22. A computer readable medium containing executable instructions, which, when executed in a processing system, causes the system to perform the steps of recovering deteriorated data points, comprising the steps of:

receiving a stream of data points having spatial-temporal correlation;

selecting a deteriorated target data point from the stream;

classifying the target data point based upon multiple class types to create a multiple classification result, said multiple class types including a motion vector class; and estimating a recovered data point for the target data based on the multiple classification result.

23. A system for restoring a deteriorated input signal, comprising:

means for selecting a data point of the deteriorated input signal;

means for classifying the data point with respect to a plurality of class types wherein one of the plurality of class types is a motion vector class;

means for creating a multiple classification result according to the plurality of class types, wherein one of the plurality of class types is a motion vector class;

means for selecting at least one filter coefficient according to the multiple classification result;

means for creating an undeteriorated data by filtering the data with the at least one filter coefficient selected.

24. A system for recovering deteriorated data points, comprising:

means for receiving a stream of data points having spatial-temporal correlation;

means for selecting a deteriorated target data point from the stream;

means for classifying the target data point based upon multiple class types to create a multiple classification result, said multiple class types including a motion vector class; and means for estimating a recovered data point for the target data based on the multiple classification result.

* * * * *